(12) United States Patent
Bertash

(10) Patent No.: US 6,928,416 B1
(45) Date of Patent: Aug. 9, 2005

(54) VIRTUAL CLIENT DISCOUNT PRICING

(76) Inventor: Michael L. Bertash, 193 Taft Crescent, Centerport, NY (US) 11721

( * ) Notice: Subject to any disclaimer, the term of this patent is extended or adjusted under 35 U.S.C. 154(b) by 0 days.

(21) Appl. No.: 09/346,787

(22) Filed: Jul. 7, 1999

(51) Int. Cl.[7] .............................................. G06F 17/60
(52) U.S. Cl. ......................................... 705/26; 705/27
(58) Field of Search ............................. 705/26, 27, 35

(56) References Cited

U.S. PATENT DOCUMENTS

| | | | | |
|---|---|---|---|---|
| 5,794,207 A | * | 8/1998 | Walker et al. ................. | 705/1 |
| 6,078,897 A | * | 6/2000 | Rubin et al. ................... | 705/35 |
| 6,101,484 A | * | 8/2000 | Halbert et al. ................ | 705/26 |
| 6,108,639 A | * | 8/2000 | Walker et al. ................ | 705/26 |
| 6,260,024 B1 | * | 7/2001 | Shkedy ........................ | 705/10 |
| 6,269,343 B1 | * | 7/2001 | Pallakoff ..................... | 705/26 |
| 6,338,047 B1 | * | 1/2002 | Wallman ..................... | 705/36 |
| 6,418,415 B1 | * | 7/2002 | Walker et al. ............... | 705/26 |
| 6,584,451 B1 | * | 6/2003 | Shoham et al. .............. | 705/26 |
| 6,631,356 B1 | * | 10/2003 | Van Horn et al. ........... | 705/26 |

FOREIGN PATENT DOCUMENTS

EP      0 845 747    *   6/1998

OTHER PUBLICATIONS

Sairamesh et al.; "Economic Framework for Pricing and Charging in Digital Libraries," D–Lab Magazine, ISSN 1082–9873, Feb. 1996.*

Negromante, Nicholas; "Psst! Transactions," Forbes, 80th Issue, Jul. 7, 1997.*

Lal, Rajiv; Staelin, Richard; "An Approach for Developing an Optimal Discount Pricing Policy," Management Science, vol. 30, n12, #1524, Dec. 1984.*

Bailey et al.; "An Exploratory Study of the Emerging Role of Electronic Intermediaries," International Journal of Electronic Commerce, vol. 1, n3, p. 7–20, Spring 1997.*

Downing, Neil; "Money in the banks: Advisors form fund to invest in banking sector;" Providence Journal–Bulletin; pE.01; Dec. 22, 1998.*

"Institutional Investors;" Boston Globe; Dec. 18, 1995.*

"Brokers view the market;" Mercer Business; v69, n4, s1, p. 12; Apr. 1993.*

U.S. Appl. No. 60/097,933, Matthew G. Pallakoff, filed Sep. 1998.*

U.S. Appl. No. 60/097,932, Matthew G. Pallakoff, filed Sep. 1998.*

* cited by examiner

*Primary Examiner*—Jeffrey A. Smith
*Assistant Examiner*—Forest Thompson, Jr.
(74) *Attorney, Agent, or Firm*—Meyertons Hood Kivlin Kowert & Goetzel, P.C.

(57) ABSTRACT

A Virtual Client Discount Pricing system and method that allows a number of individuals or entities, referred to as participants, to create a virtual client for the purpose of purchasing, leasing or renting of products and services, especially investment management services. The plurality of individuals or entities, referred to as participants, gather together to form the virtual client. In general, the virtual client is created to enable the participants to access goods or services from a provider, or numerous providers, using a discounted rate. In this manner, when the participants of the virtual client access goods or services from the provider, each of the participants receives a discounted rate from the provider using the virtual client, as compared to each of the participants individually accessing goods or services from the provider.

54 Claims, 29 Drawing Sheets

Current Industry Model

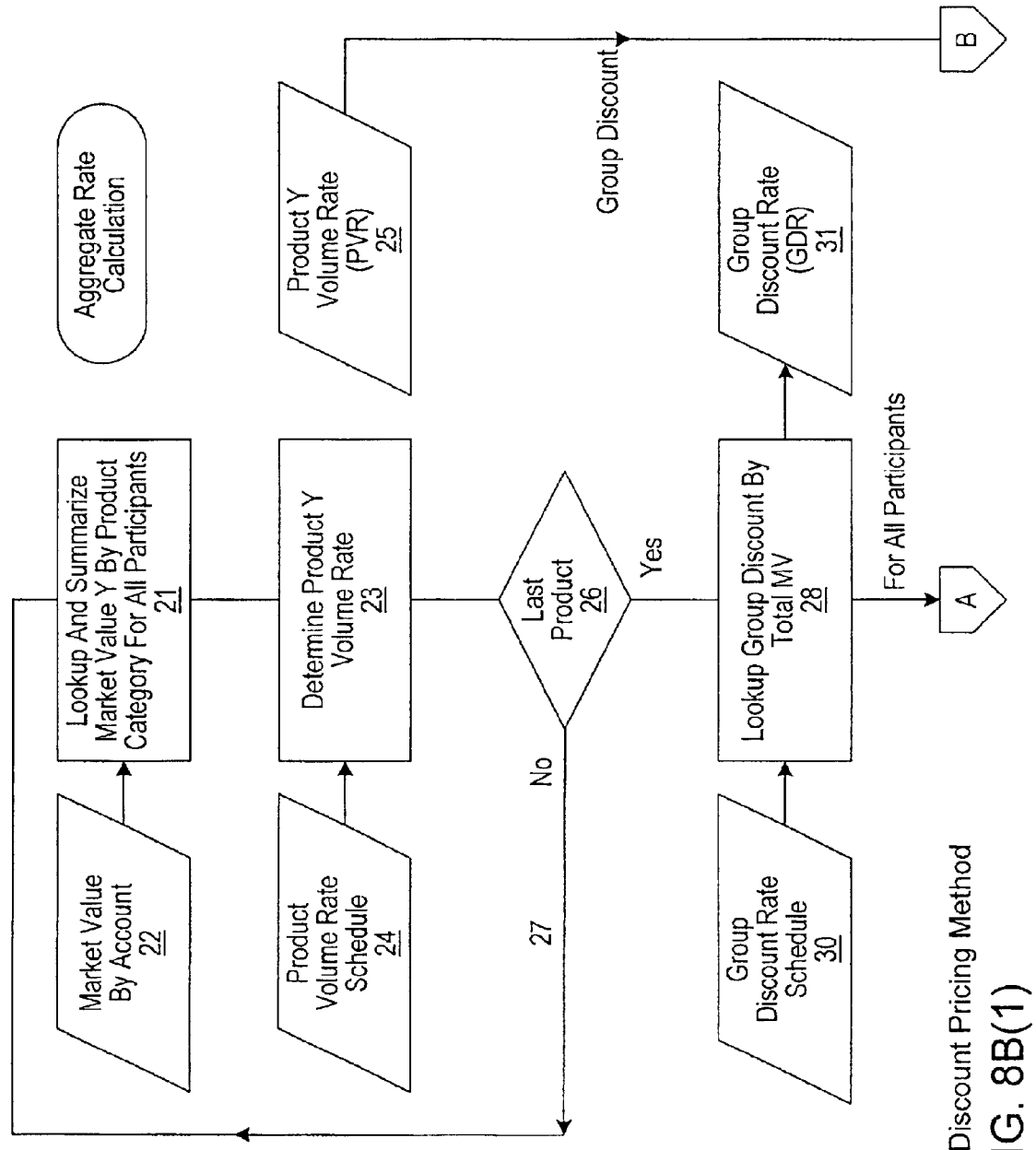
FIG. 8B(1)
Virtual Client Discount Pricing Method

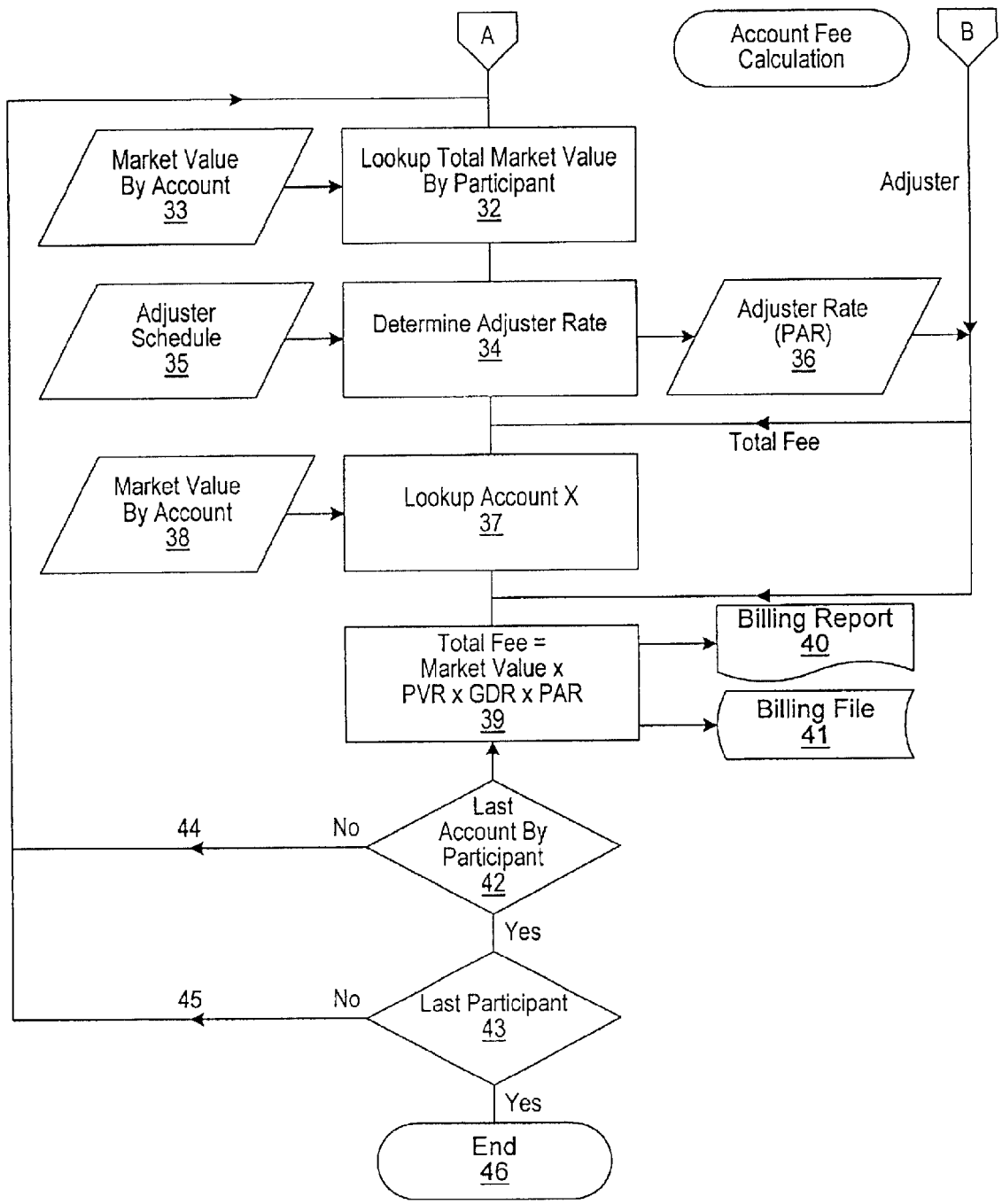
Virtual Client Discount Pricing Method
FIG. 8B(2)

|   | A | B | C | D | E | F | G | H | I | J | K |
|---|---|---|---|---|---|---|---|---|---|---|---|
| 3 | Current Industry Pricing Model - Summary | | | | | | | | | | |
| 4 | | | | | | | | | | | |
| 5 | Methodology: Total Fee = Market Value x Client Billing Rate | | | | | | | | | | |
| 6 | | | | | | | | | | | |
| 7 | Product 1 Fee Schedule | | | | | | Product 2 Fee Schedule | | | | |
| 8 | First $10mm of assets 65 basis points | | | | | | First $10mm of assets 75 basis points | | | | |
| 9 | Next $25mm of assets 50 basis points | | | | | | Next $25mm of assets 60 basis points | | | | |
| 10 | Next $65mm of assets 35 basis points | | | | | | Next $65mm of assets 50 basis points | | | | |
| 11 | Next $100mm of assets 30 basis points | | | | | | Next $100mm of assets 40 basis points | | | | |
| 12 | | | Account | | Client | | | | | | Participant |
| 13 | | | Market | | Billing | | | | | | Market |
| 14 | Account | Product | Value | | Rate | | Total Fee | | Participant | | Value |
| 15 | 1 | 1 | 11 | | 63.6 | | 70,000 | | 1 | | 11 |
| 16 | 2 | 1 | 32 | | 54.7 | | 175,000 | | 2 | | 32 |
| 17 | 3 | 1 | 22 | | 56.8 | | 125,000 | | 3 | | 22 |
| 18 | 4 | 1 | 74 | | 44.1 | | 326,500 | | 4 | | 74 |
| 19 | 5 | 1 | 145 | | 38.1 | | 552,500 | | 5 | | 145 |
| 20 | 6 | 1 | 10 | | 65.0 | | 65,000 | | 6 | | 10 |
| 21 | 7 | 1 | 65 | | 45.4 | | 295,000 | | 7 | | 65 |
| 22 | 8 | 1 | 33 | | 54.5 | | 180,000 | | 8 | | 33 |
| 23 | 9 | 1 | 50 | | 48.5 | | 242,500 | | 9 | | 50 |
| 24 | 10 | 1 | 97 | | 42.0 | | 407,000 | | 10 | | 97 |
| 25 | 11 | 2 | 15 | | 70.0 | | 105,000 | | 1 | | 15 |
| 26 | 12 | 2 | 32 | | 64.7 | | 207,000 | | 12 | | 32 |
| 27 | 13 | 2 | 22 | | 66.8 | | 147,000 | | 13 | | 22 |
| 28 | 14 | 2 | 74 | | 56.8 | | 420,000 | | 14 | | 74 |
| 29 | 15 | 2 | 145 | | 50.3 | | 730,000 | | 15 | | 145 |
| 30 | 16 | 2 | 10 | | 75.0 | | 75,000 | | 16 | | 10 |
| 31 | 17 | 2 | 65 | | 57.7 | | 375,000 | | 17 | | 65 |
| 32 | 18 | 2 | 33 | | 64.5 | | 213,000 | | 18 | | 33 |
| 33 | 19 | 2 | 50 | | 60.0 | | 300,000 | | 19 | | 50 |
| 34 | 20 | 2 | 97 | | 55.2 | | 535,000 | | 20 | | 97 |
| 35 | Total | | $1,082 | | 51.3 | | $5,545,500 | | | | |

FIG. 9

|    | A | B | C | D | E | F | G | H | I | J | K | L | M | N |
|----|---|---|---|---|---|---|---|---|---|---|---|---|---|---|
| 41 | TABLE OF CONTENTS | | | | | | | | | | | | | |
| 42 | | | | | | | | | | | | | | |
| 43 | | | | | | | | | | | | | | |
| 44 | | | | | | | | | | | Section | | | |
| 45 | | | | | | | | | | | | | | |
| 46 | Virtual Client Discount Pricing Method - Multi-Product Summary | | | | | | | | | | 1 | | | |
| 47 | | | | | | | | | | | | | | |
| 48 | Virtual Client Discount Pricing Method - Single Product Example | | | | | | | | | | 2 | | | |
| 49 | | | | | | | | | | | | | | |
| 50 | Virtual Client Discount Pricing Method - Multi-Product Example | | | | | | | | | | 3 | | | |
| 51 | | | | | | | | | | | | | | |
| 52 | | | | | | | | | | | | | | |
| 53 | *Italics indicate input for model.* | | | | | | | | | | | | | |

| | A | B | C | D | E | F | G | H | I | J | K | L | M | N |
|---|---|---|---|---|---|---|---|---|---|---|---|---|---|---|
| 74 | Section 1 | | | | | | | | | | | | | |
| 75 | | | | | | | | | | | | | | |
| 76 | Virtual Client Discount Pricing Method - Multi-Product Summary | | | | | | | | | | | | | |
| 77 | | | | | | | | | | | | | | |
| 78 | | | | | | | | | | | | | | |
| 79 | Methodology: | | | | | | | | | | | | | |
| 80 | Total Fee = Product Volume + Group Discount + Adjuster | | | | | | | | | | | | | |
| 81 | Product Volume Fee = Market Value x Product Volume Rate | | | | | | | | | | | | | |
| 82 | Group Discount = Market Value x Group Discount Rate | | | | | | | | | | | | | |
| 83 | Adjuster = Market Value x Adjuster Rate | | | | | | | | | | | | | |
| 84 | | | | | | | | | | | | | | |
| 85 | | | Account | | Product Volume | | Group | | | | Total Fee | Total Fee | | Participant |
| 86 | | | Market | | | | | | | | | | | Market |
| 87 | Account | Product | Value | | Fee | Rate | Discount | Rate | Adjuster | Rate | Dollars | Basis Pts | Participant | Value |
| 88 | 1 | 1 | 11 | | 31,806 | 28.9 | -550 | -0.50 | 0 | 0.0 | 31,256 | 28.4 | 1 | 26 |
| 89 | 2 | 1 | 32 | | 92,527 | 28.9 | -1,600 | -0.50 | 0 | 0.0 | 90,927 | 28.4 | 2 | 32 |
| 90 | 3 | 1 | 22 | | 63,612 | 28.9 | -1,100 | -0.50 | 11,000 | 5.0 | 73,512 | 33.4 | 3 | 22 |
| 91 | 4 | 1 | 74 | | 213,966 | 28.9 | -3,700 | -0.50 | -37,000 | -5.0 | 173,268 | 23.4 | 4 | 74 |
| 92 | 5 | 1 | 145 | | 419,263 | 28.9 | -7,250 | -0.50 | -145,000 | -10.0 | 267,013 | 18.4 | 5 | 145 |
| 93 | 6 | 1 | 10 | | 28,915 | 28.9 | -500 | -0.50 | 5,000 | 5.0 | 33,415 | 33.4 | 6 | 10 |
| 94 | 7 | 1 | 65 | | 187,945 | 28.9 | -3,250 | -0.50 | -32,500 | -5.0 | 152,195 | 23.4 | 7 | 65 |
| 95 | 8 | 1 | 33 | | 95,418 | 28.9 | -1,650 | -0.50 | 0 | 0.0 | 93,768 | 28.4 | 8 | 33 |
| 96 | 9 | 1 | 50 | | 144,573 | 28.9 | -2,500 | -0.50 | -25,000 | -5.0 | 117,073 | 23.4 | 9 | 50 |
| 97 | 10 | 1 | 97 | | 280,472 | 28.9 | -4,850 | -0.50 | -48,500 | -5.0 | 227,122 | 23.4 | 10 | 97 |
| 98 | 11 | 2 | 15 | | 52,099 | 34.7 | -750 | -0.50 | 0 | 0.0 | 51,349 | 34.2 | 11 | 26 |
| 99 | 12 | 2 | 32 | | 111,145 | 34.7 | -1,600 | -0.50 | 0 | 0.0 | 109,545 | 34.2 | 12 | 32 |
| 100 | 13 | 2 | 22 | | 76,413 | 34.7 | -1,100 | -0.50 | 11,000 | 5.0 | 86,313 | 39.2 | 13 | 22 |
| 101 | 14 | 2 | 74 | | 257,024 | 34.7 | -3,700 | -0.50 | -37,000 | -5.0 | 216,324 | 29.2 | 14 | 74 |
| 102 | 15 | 2 | 145 | | 503,628 | 34.7 | -7,250 | -0.50 | -145,000 | -10.0 | 351,378 | 24.2 | 15 | 145 |
| 103 | 16 | 2 | 10 | | 34,733 | 34.7 | -500 | -0.50 | 5,000 | 5.0 | 39,233 | 39.2 | 16 | 10 |
| 104 | 17 | 2 | 65 | | 225,764 | 34.7 | -3,250 | -0.50 | -32,500 | -5.0 | 190,014 | 29.2 | 17 | 65 |
| 105 | 18 | 2 | 33 | | 114,619 | 34.7 | -1,650 | -0.50 | 0 | 0.0 | 112,969 | 34.2 | 18 | 33 |
| 106 | 19 | 2 | 50 | | 173,665 | 34.7 | -2,500 | -0.50 | -25,000 | -5.0 | 146,165 | 29.2 | 19 | 50 |
| 107 | 20 | 2 | 97 | | 336,910 | 34.7 | -4,850 | -0.50 | -48,500 | -5.0 | 283,560 | 29.2 | 20 | 97 |
| 108 | Total | | $1,082 | | $3,444,500 | | -$54,100 | | -$544,000 | | $2,846,400 | 26.3 | | |
| 109 | | | | | | | | | | | | | | |
| 110 | | | | | | | | | | | | | | |
| 111 | | | | | | | | | | | | | | |
| 112 | Comparison of Fee Structures | | | | | | | | | | | | | |
| 113 | | | | | Market | | Total Fee | | Total Fee | | | | | |
| 114 | | | | | Value | | Dollars | | Basis Points | | | | | |
| 115 | Current Industry Pricing Model | | | | $1,082 | | $5,545,500 | | 51.3 | | | | | |
| 116 | Virtual Client Discount Pricing Method | | | | $1,082 | | $2,846,400 | | 26.3 | | | | | |
| 117 | | | | | | | | | | | | | | |
| 118 | Differential | | | | | | $2,699,100 | | 24.9 | | | | | |

|     | A | B | C | D | E | F | G | H | I | J | K |
| --- | --- | --- | --- | --- | --- | --- | --- | --- | --- | --- | --- |
| 123 | Section 2 | | | | | | | | | | |
| 124 | | | | | | | | | | | |
| 125 | Virtual Client Discount Pricing Method - Single Product Example | | | | | | | | | | |
| 126 | Product Volume | | | | | | | | | | |
| 127 | | | | | | | | | | | |
| 128 | Methodology: Product Volume Fee = Market Value x Product Volume Rate | | | | | | | | | | |
| 129 | | | | | | | | | | | |
| 130 | Product 1 Fee Schedule | | | | | | | | | | |
| 131 | First $100mm of assets 40 basis points | | | | | | | | | | |
| 132 | Next $100mm of assets 35 basis points | | | | | | | | | | |
| 133 | Next $100mm of assets 30 basis points | | | | | | | | | | |
| 134 | Next $100mm of assets 25 basis points | | | | | | | | | | |
| 135 | Next $100mm of assets 20 basis points | | | | | | | | | | |
| 136 | Over $500mm of assets 15 basis points | | | | | | | | | | |
| 137 | | | | | | Product | Product | | | | Participant |
| 138 | | | Market | | | Volume | Volume | | | | Market |
| 139 | Account | Product | Value | | | Rate | Fee | | Participant | | Value |
| 140 | 1 | 1 | 11 | | | 28.9 | 31,806 | | 1 | | 11 |
| 141 | 2 | 1 | 32 | | | 28.9 | 92,527 | | 2 | | 32 |
| 142 | 3 | 1 | 22 | | | 28.9 | 63,612 | | 3 | | 22 |
| 143 | 4 | 1 | 74 | | | 28.9 | 213,968 | | 4 | | 74 |
| 144 | 5 | 1 | 145 | | | 28.9 | 419,263 | | 5 | | 145 |
| 145 | 6 | 1 | 10 | | | 28.9 | 28,915 | | 6 | | 10 |
| 146 | 7 | 1 | 65 | | | 28.9 | 187,945 | | 7 | | 65 |
| 147 | 8 | 1 | 33 | | | 28.9 | 95,418 | | 8 | | 33 |
| 148 | 9 | 1 | 50 | | | 28.9 | 144,573 | | 9 | | 50 |
| 149 | 10 | 1 | 97 | | | 28.9 | 280,472 | | 10 | | 97 |
| 150 | Total | | $539 | | | 28.9 | $1,558,500 | | | | |

FIG. 10C

| | A | B | C | D | E | F | G | H |
|---|---|---|---|---|---|---|---|---|
| 153 | Virtual Client Discount Pricing Method - Single Product Example | | | | | | | |
| 154 | Group Discount | | | | | | | |
| 155 | | | | | | | | |
| 156 | Methodology: Group Discount = Market Value x Group Discount Rate | | | | | | | |
| 157 | | | | | | | | |
| 158 | Base - $500 | -0.25 | | | | | | |
| 159 | Accelerator | -0.25 | | | | | | |
| 160 | Market Value | $539 | | | Market | | | Group Discount |
| 161 | | | | | Value | | | Rate |
| 162 | | | | | $500 | | | -0.25 |
| 163 | | | | | $1,000 | | | -0.50 |
| 164 | | | | | $1,500 | | | -0.75 |
| 165 | | | | | $2,000 | | | -1.00 |
| 166 | | | | | $2,500 | | | -1.25 |
| 167 | | | | | $3,000 | | | -1.50 |
| 168 | | | | | $3,500 | | | -1.75 |
| 169 | | | | | $4,000 | | | -2.00 |
| 170 | | | | | $4,500 | | | -2.25 |
| 171 | | | | | $5,000 | | | -2.50 |
| 172 | | | | Market | | Group Discount | | Group |
| 173 | | Account | Product | Value | | Rate | | Discount |
| 174 | | 1 | 1 | 11 | | -0.25 | | -275 |
| 175 | | 2 | 1 | 32 | | -0.25 | | -800 |
| 176 | | 3 | 1 | 22 | | -0.25 | | -550 |
| 177 | | 4 | 1 | 74 | | -0.25 | | -1,850 |
| 178 | | 5 | 1 | 145 | | -0.25 | | -3,625 |
| 179 | | 6 | 1 | 10 | | -0.25 | | -250 |
| 180 | | 7 | 1 | 65 | | -0.25 | | -1,625 |
| 181 | | 8 | 1 | 33 | | -0.25 | | -825 |
| 182 | | 9 | 1 | 50 | | -0.25 | | -1,250 |
| 183 | | 10 | 1 | 97 | | -0.25 | | -2,425 |
| | | Total | | $539 | | -0.25 | | -$13,475 |

FIG. 10D

| | A | B | C | D | E | F | G | H | I | J | K |
|---|---|---|---|---|---|---|---|---|---|---|---|
| 186 | Virtual Client Discount Pricing Method - Single Product Example | | | | | | | | | | |
| 187 | Adjuster | | | | | | | | | | |
| 188 | | | | | | | | | | | |
| 189 | Methodology: Adjuster = Market Value x Adjuster Rate | | | | | | | | | | |
| 190 | | | | | | | | | | | |
| 191 | | Market Adjuster | | | | | | | | | |
| 192 | | Value | Rate | | | | | | | | |
| 193 | | 0-10 | 10 | | | | | | | | |
| 194 | | 11-25 | 5 | | | | | | | | |
| 195 | | 26-50 | 0 | | | | | | | | |
| 196 | | 51-100 | -5 | | | | | | | | |
| 197 | | 101-200 | -10 | | | | | | | | |
| 198 | | 201-500 | -15 | | | | | | | | |
| 199 | | | | | | | | | | | Participant |
| 200 | | | | Market | Adjuster | | | | | | Market |
| 201 | Account | Product | | Value | Rate | | Adjuster | | Participant | | Value |
| 202 | 1 | 1 | | 11 | 5.0 | | 5,500 | | 1 | | 11 |
| 203 | 2 | 1 | | 32 | 0.0 | | 0 | | 2 | | 32 |
| 204 | 3 | 1 | | 22 | 5.0 | | 11,000 | | 3 | | 22 |
| 205 | 4 | 1 | | 74 | -5.0 | | -37,000 | | 4 | | 74 |
| 206 | 5 | 1 | | 145 | -10.0 | | -145,000 | | 5 | | 145 |
| 207 | 6 | 1 | | 10 | 5.0 | | 5,000 | | 6 | | 10 |
| 208 | 7 | 1 | | 65 | -5.0 | | -32,500 | | 7 | | 65 |
| 209 | 8 | 1 | | 33 | 0.0 | | 0 | | 8 | | 33 |
| 210 | 9 | 1 | | 50 | -5.0 | | -25,000 | | 9 | | 50 |
| 211 | 10 | 1 | | 97 | -5.0 | | -48,500 | | 10 | | 97 |
| 212 | Total | | | $539 | -4.9 | | -$266,500 | | | | |

FIG. 10E

| | A | B | C | D | E | F | G | H | I | J | K | L | M | N |
|---|---|---|---|---|---|---|---|---|---|---|---|---|---|---|
| 215 | Virtual Client Discount Pricing Method - Single Product Example | | | | | | | | | | | | | |
| 216 | Total Fee | | | | | | | | | | | | | |
| 217 | | | | | | | | | | | | | | |
| 218 | Methodology: | | | | | | | | | | | | | |
| 219 | Total Fee = Product Volume + Group Discount + Adjuster | | | | | | | | | | | | | |
| 220 | Product Volume Fee = Market Value x Product Volume Rate | | | | | | | | | | | | | |
| 221 | Group Discount = Market Value x Group Discount Rate | | | | | | | | | | | | | |
| 222 | Adjuster = Market Value x Adjuster Rate | | | | | | | | | | | | | |
| 223 | | | Account | | Product Volume | | Group | | | | Total Fee | Total Fee | | Participant |
| 224 | | | Market | | | | | | | | | | | Market |
| 225 | Account | Product | Value | | Fee | Rate | Discount | Rate | Adjuster | Rate | Dollars | Basis Pts | Participant | Value |
| 226 | 1 | 1 | 11 | | 31,806 | 28.9 | -275 | -0.25 | 5,500 | 5 | 37,031 | 33.7 | 1 | 11 |
| 227 | 2 | 1 | 32 | | 92,527 | 28.9 | -800 | -0.25 | 0 | 0 | 91,727 | 28.7 | 2 | 32 |
| 228 | 3 | 1 | 22 | | 63,612 | 28.9 | -550 | -0.25 | 11,000 | 5 | 74,062 | 33.7 | 3 | 22 |
| 229 | 4 | 1 | 74 | | 213,968 | 28.9 | -1,850 | -0.25 | -37,000 | -5 | 175,118 | 23.7 | 4 | 74 |
| 230 | 5 | 1 | 145 | | 419,263 | 28.9 | -3,625 | -0.25 | -145,000 | -10 | 270,638 | 18.7 | 5 | 145 |
| 231 | 6 | 1 | 10 | | 28,915 | 28.9 | -250 | -0.25 | 5,000 | 5 | 33,665 | 33.7 | 6 | 10 |
| 232 | 7 | 1 | 65 | | 187,945 | 28.9 | -1,625 | -0.25 | -32,500 | -5 | 153,820 | 23.7 | 7 | 65 |
| 233 | 8 | 1 | 33 | | 95,418 | 28.9 | -825 | -0.25 | 0 | 0 | 94,593 | 28.7 | 8 | 33 |
| 234 | 9 | 1 | 50 | | 144,573 | 28.9 | -1,250 | -0.25 | -25,000 | -5 | 118,323 | 23.7 | 9 | 50 |
| 235 | 10 | 1 | 97 | | 280,472 | 28.9 | -2,425 | -0.25 | -48,500 | -5 | 229,547 | 23.7 | 10 | 97 |
| 236 | Total | | $539 | | $1,558,500 | | -$13,475 | | -$266,500 | | $1,278,525 | 23.7 | | |

FIG. 10F

Section 3

Virtual Client Discount Pricing Method - Multi-Product Example

Product Volume

Methodology: Product Volume Fee = Market Value x Product Volume Rate

Product 1 Fee Schedule

First $100mm of assets 40 basis points
Next $100mm of assets 35 basis points
Next $100mm of assets 30 basis points
Next $100mm of assets 25 basis points
Next $100mm of assets 20 basis points
Over $500mm of assets 15 basis points

| Account | Product | Market Value | Product Volume Rate | Product Volume Fee | Participant | Participant Market Value |
|---|---|---|---|---|---|---|
| 1 | 1 | 11 | 28.9 | 31,806 | 1 | 26 |
| 2 | 1 | 32 | 28.9 | 92,527 | 2 | 32 |
| 3 | 1 | 22 | 28.9 | 63,612 | 3 | 22 |
| 4 | 1 | 74 | 28.9 | 213,968 | 4 | 74 |
| 5 | 1 | 145 | 28.9 | 419,263 | 5 | 145 |
| 6 | 1 | 10 | 28.9 | 28,915 | 6 | 10 |
| 7 | 1 | 65 | 28.9 | 187,945 | 7 | 65 |
| 8 | 1 | 33 | 28.9 | 95,418 | 8 | 33 |
| 9 | 1 | 50 | 28.9 | 144,573 | 9 | 50 |
| 10 | 1 | 97 | 28.9 | 280,472 | 10 | 97 |
| Total | | $539 | 28.9 | $1,558,500 | | |

FIG. 10G

|     | A | B | C | D | E | F | G | H | I | J | K |
|---|---|---|---|---|---|---|---|---|---|---|---|
| 269 | Virtual Client Discount Pricing Method - Multi-Product Example ||||||||||
| 270 | Product Volume ||||||||||
| 271 | ||||||||||
| 272 | Methodology: Product Volume Fee = Market Value x Product Volume Rate ||||||||||
| 273 | ||||||||||
| 274 | Product 2 Fee Schedule ||||||||||
| 275 | First $100mm of assets 50 basis points ||||||||||
| 276 | Next $100mm of assets 40 basis points ||||||||||
| 277 | Next $100mm of assets 35 basis points ||||||||||
| 278 | Next $100mm of assets 30 basis points ||||||||||
| 279 | Next $100mm of assets 25 basis points ||||||||||
| 280 | Over $500mm of assets 20 basis points ||||||||||
| 281 | | | | | Product | | Product | | | | Participant |
| 282 | | | Market | | Volume | | Volume | | | | Market |
| 283 | Account | Product | Value | | Rate | | Fee | | Participant | | Value |
| 284 | 11 | 2 | 15 | | 34.7 | | 52,099 | | 1 | | 26 |
| 285 | 12 | 2 | 32 | | 34.7 | | 111,145 | | 12 | | 32 |
| 286 | 13 | 2 | 22 | | 34.7 | | 76,413 | | 13 | | 22 |
| 287 | 14 | 2 | 74 | | 34.7 | | 257,024 | | 14 | | 74 |
| 288 | 15 | 2 | 145 | | 34.7 | | 503,628 | | 15 | | 145 |
| 289 | 16 | 2 | 10 | | 34.7 | | 34,733 | | 16 | | 10 |
| 290 | 17 | 2 | 65 | | 34.7 | | 225,764 | | 17 | | 65 |
| 291 | 18 | 2 | 33 | | 34.7 | | 114,619 | | 18 | | 33 |
| 292 | 19 | 2 | 50 | | 34.7 | | 173,665 | | 19 | | 50 |
| 293 | 20 | 2 | 97 | | 34.7 | | 336,910 | | 20 | | 97 |
| 294 | | Total | $543 | | 34.7 | | $1,886,000 | | | | |
| 295 | ||||||||||
| 296 | Product Volume ||||||||||
| 297 | ||||||||||
| 298 | Product 1 | | 28.9 | $1,558,500 | | | | | | | |
| 299 | Product 2 | | 34.7 | $1,886,000 | | | | | | | |
| 300 | Total | | | $3,444,500 | | | | | | | |

FIG. 10H

| | A | B | C | D | E | F | G | H | I | J | K | L | M | N |
|---|---|---|---|---|---|---|---|---|---|---|---|---|---|---|
| 303 | Virtual Client Discount Pricing Method - Multi-Product Example | | | | | | | | | | | | | |
| 304 | Group Discount | | | | | | | | | | | | | |
| 305 | | | | | | | | | | | | | | |
| 306 | Methodology: Group Discount = Market Value x Group Discount Rate | | | | | | | | | | | | | |
| 307 | | | | | | | | | | | | | | |
| 308 | Base - $500 | -0.25 | | | | Market | Group Discount | | | | | | | |
| 309 | Accelerator | -0.25 | | | | Value | Rate | | | | | | | |
| 310 | Market Value | $1,082 | | | | 500 | -0.25 | | | | | | | |
| 311 | | | | | | 1,000 | -0.50 | | | | | | | |
| 312 | | | | | | 1,500 | -0.75 | | | | | | | |
| 313 | | | | | | 2,000 | -1.00 | | | | | | | |
| 314 | | | | | | 2,500 | -1.25 | | | | | | | |
| 315 | | | | | | 3,000 | -1.50 | | | | | | | |
| 316 | | | | | | 3,500 | -1.75 | | | | | | | |
| 317 | | | | | | 4,000 | -2.00 | | | | | | | |
| 318 | | | | | | 4,500 | -2.25 | | | | | | | |
| 319 | | | | | | 5,000 | -2.50 | | | | | | | |

| | A | B | C | D | E | F | G | H | I | J | K | L | M | N |
|---|---|---|---|---|---|---|---|---|---|---|---|---|---|---|
| 321 | Virtual Client Discount Pricing Method - Multi-Product Example | | | | | | | | | | | | | |
| 322 | Group Discount | | | | | | | | | | | | | |
| 323 | | | | | | | | | | | | | | |
| 324 | Methodology: Group Discount = Market Value x Group Discount Rate | | | | | | | | | | | | | |
| 325 | | | | | | | | | | | | | | |
| 326 | | | | Market | Group Discount | | Group | | | | | | | |
| 327 | | Account | Product | Value | Rate | | Discount | | | | | | | |
| 328 | | 1 | 1 | 11 | -0.50 | | -550 | | | | | | | |
| 329 | | 2 | 1 | 32 | -0.50 | | -1,600 | | | | | | | |
| 330 | | 3 | 1 | 22 | -0.50 | | -1,100 | | | | | | | |
| 331 | | 4 | 1 | 74 | -0.50 | | -3,700 | | | | | | | |
| 332 | | 5 | 1 | 145 | -0.50 | | -7,250 | | | | | | | |
| 333 | | 6 | 1 | 10 | -0.50 | | -500 | | | | | | | |
| 334 | | 7 | 1 | 65 | -0.50 | | -3,250 | | | | | | | |
| 335 | | 8 | 1 | 33 | -0.50 | | -1,650 | | | | | | | |
| 336 | | 9 | 1 | 50 | -0.50 | | -2,500 | | | | | | | |
| 337 | | 10 | 1 | 97 | -0.50 | | -4,850 | | | | | | | |
| 338 | | 11 | 2 | 15 | -0.50 | | -750 | | | | | | | |
| 339 | | 12 | 2 | 32 | -0.50 | | -1,600 | | | | | | | |
| 340 | | 13 | 2 | 22 | -0.50 | | -1,100 | | | | | | | |
| 341 | | 14 | 2 | 74 | -0.50 | | -3,700 | | | | | | | |
| 342 | | 15 | 2 | 145 | -0.50 | | -7,250 | | | | | | | |
| 343 | | 16 | 2 | 10 | -0.50 | | -500 | | | | | | | |
| 344 | | 17 | 2 | 65 | -0.50 | | -3,250 | | | | | | | |
| 345 | | 18 | 2 | 33 | -0.50 | | -1,650 | | | | | | | |
| 346 | | 19 | 2 | 50 | -0.50 | | -2,500 | | | | | | | |
| 347 | | 20 | 2 | 97 | -0.50 | | -4,850 | | | | | | | |
| 348 | Total | | | $1,082 | -0.50 | | -$54,100 | | | | | | | |

FIG. 10K

| | A | B | C | D | E | F | G | H | I | J | K | L | M | N |
|---|---|---|---|---|---|---|---|---|---|---|---|---|---|---|
| 350 | Virtual Client Discount Pricing Method - Multi-Product Example | | | | | | | | | | | | | |
| 351 | Adjuster | | | | | | | | | | | | | |
| 352 | | | | | | | | | | | | | | |
| 353 | Methodology: | | Adjuster = Market Value x Adjuster Rate | | | | | | | | | | | |
| 354 | | | | | | | | | | | | | | |
| 355 | | Market Adjuster | | | | | | | | | | | | |
| 356 | | Value | Rate | | | | | | | | | | | |
| 357 | | 0-10 | 10 | | | | | | | | | | | |
| 358 | | 11-25 | 5 | | | | | | | | | | | |
| 359 | | 26-50 | 0 | | | | | | | | | | | |
| 360 | | 51-100 | -5 | | | | | | | | | | | |
| 361 | | 101-200 | -10 | | | | | | | | | | | |
| 362 | | 201-500 | -15 | | | | | | | | | | | |
| 363 | | | | | | | | | | | | | | |
| 364 | | | Market | | Adjuster | | | | | | | Participant | Adjuster | |
| 365 | Account | Product | Value | | Rate | | Adjuster | | Participant | | | Market Value | Rate | |
| 366 | 1 | 1 | 11 | | 0.0 | | 0 | | 1 | | Account 1 | $11 | 5 | |
| 367 | 2 | 1 | 32 | | 0.0 | | 0 | | 2 | | Account 11 | $15 | 5 | |
| 368 | 3 | 1 | 22 | | 5.0 | | 11,000 | | 3 | | *Participant* | $26 | 0 | |
| 369 | 4 | 1 | 74 | | -5.0 | | -37,000 | | 4 | | | | | |
| 370 | 5 | 1 | 145 | | -10.0 | | -145,000 | | 5 | | | | | |
| 371 | 6 | 1 | 10 | | 5.0 | | 5,000 | | 6 | | | | | |
| 372 | 7 | 1 | 65 | | -5.0 | | -32,500 | | 7 | | | | | |
| 373 | 8 | 1 | 33 | | 0.0 | | 0 | | 8 | | | | | |
| 374 | 9 | 1 | 50 | | -5.0 | | -25,000 | | 9 | | | | | |
| 375 | 10 | 1 | 97 | | -5.0 | | -48,500 | | 10 | | | | | |
| 376 | 11 | 2 | 15 | | 0.0 | | 0 | | 1 | | | | | |
| 377 | 12 | 2 | 32 | | 0.0 | | 0 | | 12 | | | | | |
| 378 | 13 | 2 | 22 | | 5.0 | | 11,000 | | 13 | | | | | |
| 379 | 14 | 2 | 74 | | -5.0 | | -37,000 | | 14 | | | | | |
| 380 | 15 | 2 | 145 | | -10.0 | | -145,000 | | 15 | | | | | |
| 381 | 16 | 2 | 10 | | 5.0 | | 5,000 | | 16 | | | | | |
| 382 | 17 | 2 | 65 | | -5.0 | | -32,500 | | 17 | | | | | |
| 383 | 18 | 2 | 33 | | 0.0 | | 0 | | 18 | | | | | |
| 384 | 19 | 2 | 50 | | -5.0 | | -25,000 | | 19 | | | | | |
| 385 | 20 | 2 | 97 | | -5.0 | | -48,500 | | 20 | | | | | |
| 386 | Total | | $1,082 | | | | -$544,000 | | | | | | | |

|   | A | B | C | D | E | F | G | H | I | J | K | L | M | N |
|---|---|---|---|---|---|---|---|---|---|---|---|---|---|---|
| 388 | Virtual Client Discount Pricing Method - Multi-Product Example | | | | | | | | | | | | | |
| 389 | Total Fee | | | | | | | | | | | | | |
| 390 | | | | | | | | | | | | | | |
| 391 | Methodology: | | | | | | | | | | | | | |
| 392 | Total Fee = Product Volume + Group Discount + Adjuster | | | | | | | | | | | | | |
| 393 | Product Volume Fee = Market Value x Product Volume Rate | | | | | | | | | | | | | |
| 394 | Group Discount = Market Value x Group Discount Rate | | | | | | | | | | | | | |
| 395 | Adjuster = Market Value x Adjuster Rate | | | | | | | | | | | | | |
| 396 | | | Account | | | | | | | | | | | Participant |
| 397 | | | Market | | Product Volume | | Group | | | | Total Fee | Total Fee | | Market |
| 398 | Account | Product | Value | | Fee | Rate | Discount | Rate | Adjuster | Rate | Dollars | Basis Pts | Participant | Value |
| 399 | 1 | 1 | 11 | | 31,806 | 28.9 | -550 | -0.50 | 0 | 0.0 | 31,256 | 28.4 | 1 | 1 |
| 400 | 2 | 1 | 32 | | 92,527 | 28.9 | -1,600 | -0.50 | 0 | 0.0 | 90,927 | 28.4 | 2 | 32 |
| 401 | 3 | 1 | 22 | | 63,612 | 28.9 | -1,100 | -0.50 | 11,000 | 5.0 | 73,512 | 33.4 | 3 | 22 |
| 402 | 4 | 1 | 74 | | 213,968 | 28.9 | -3,700 | -0.50 | -37,000 | -5.0 | 173,268 | 23.4 | 4 | 74 |
| 403 | 5 | 1 | 145 | | 419,263 | 28.9 | -7,250 | -0.50 | -145,000 | -10.0 | 267,013 | 18.4 | 5 | 145 |
| 404 | 6 | 1 | 10 | | 28,915 | 28.9 | -500 | -0.50 | 5,000 | 5.0 | 33,415 | 33.4 | 6 | 10 |
| 405 | 7 | 1 | 65 | | 187,945 | 28.9 | -3,250 | -0.50 | -32,500 | -5.0 | 152,195 | 23.4 | 7 | 65 |
| 406 | 8 | 1 | 33 | | 95,418 | 28.9 | -1,650 | -0.50 | 0 | 0.0 | 93,768 | 28.4 | 8 | 33 |
| 407 | 9 | 1 | 50 | | 144,573 | 28.9 | -2,500 | -0.50 | -25,000 | -5.0 | 117,073 | 23.4 | 9 | 50 |
| 408 | 10 | 1 | 97 | | 280,472 | 28.9 | -4,850 | -0.50 | -48,500 | -5.0 | 227,122 | 23.4 | 10 | 97 |
| 409 | 11 | 2 | 15 | | 52,099 | 34.7 | -750 | -0.50 | 0 | 0.0 | 51,349 | 34.2 | 1 | 26 |
| 410 | 12 | 2 | 32 | | 111,145 | 34.7 | -1,600 | -0.50 | 0 | 0.0 | 109,545 | 34.2 | 2 | 32 |
| 411 | 13 | 2 | 22 | | 76,413 | 34.7 | -1,100 | -0.50 | 11,000 | 5.0 | 86,313 | 39.2 | 3 | 22 |
| 412 | 14 | 2 | 74 | | 257,024 | 34.7 | -3,700 | -0.50 | -37,000 | -5.0 | 216,324 | 29.2 | 4 | 74 |
| 413 | 15 | 2 | 145 | | 503,628 | 34.7 | -7,250 | -0.50 | -145,000 | -10.0 | 351,378 | 24.2 | 5 | 145 |
| 414 | 16 | 2 | 10 | | 34,733 | 34.7 | -500 | -0.50 | 5,000 | 5.0 | 39,233 | 39.2 | 6 | 10 |
| 415 | 17 | 2 | 65 | | 225,764 | 34.7 | -3,250 | -0.50 | -32,500 | -5.0 | 190,014 | 29.2 | 7 | 65 |
| 416 | 18 | 2 | 33 | | 114,619 | 34.7 | -1,650 | -0.50 | 0 | 0.0 | 112,969 | 34.2 | 8 | 33 |
| 417 | 19 | 2 | 50 | | 173,665 | 34.7 | -2,500 | -0.50 | -25,000 | -5.0 | 146,165 | 29.2 | 9 | 50 |
| 418 | 20 | 2 | 97 | | 336,910 | 34.7 | -4,850 | -0.50 | -48,500 | -5.0 | 283,560 | 29.2 | 10 | 97 |
| 419 | Total | | $1,082 | | $3,444,500 | | -$54,100 | | -$544,000 | | $2,846,400 | 26.3 | | |

FIG. 10L

| | A | B | C | D | E | F | G | H | I | J | K | L | M | N |
|---|---|---|---|---|---|---|---|---|---|---|---|---|---|---|
| 425 | Comparison of Fee Structures | | | | | | | | | | | | | |
| 426 | | | | | | | | | | | | | | |
| 427 | | | | | Market | | Total Fee | | Total Fee | | | | | |
| 428 | | | | | Value | | Dollars | | Basis Points | | | | | |
| 429 | Current Industry Pricing Model | | | | $1,082 | | $5,545,500 | | 51.3 | | | | | |
| 430 | Virtual Client Discount Pricing Method | | | | $1,082 | | $2,846,400 | | 26.3 | | | | | |
| 431 | | | | | | | | | | | | | | |
| 432 | Differential | | | | | | $2,699,100 | | 24.9 | | | | | |

FIG. 10M

|    | A                       | B | C  | D |
|----|-------------------------|---|----|---|
| 1  | Formation of Virtual Client | | | |
| 2  |                         |   |    |   |
| 3  |                         |   |    |   |
| 4  | Mr. Smith               |   |    |   |
| 5  | Mr. Green               |   |    |   |
| 6  | Mrs. Jones              |   |    |   |
| 7  | Ms. Murphy              |   |    |   |
| 8  | Mr. Richards            |   |    |   |
| 9  | Ms. Berger              |   |    |   |
| 10 | Mr. White               |   |    |   |
| 11 | Mrs. Miller             |   |    |   |
| 12 | Independent Retail Store |   | 1  |   |
| 13 | Independent Retail Store |   | 2  |   |
| 14 | Independent Retail Store |   | 3  |   |
| 15 | Independent Retail Store |   | 4  |   |
| 16 | Independent Retail Store |   | 5  |   |
| 17 | Independent Retail Store |   | 6  |   |
| 18 | Independent Retail Store |   | 7  |   |
| 19 | Independent Retail Store |   | 8  |   |
| 20 | Independent Retail Store |   | 9  |   |
| 21 | Independent Retail Store |   | 10 |   |
| 22 | Independent Retail Store |   | 11 |   |
| 23 | Independent Retail Store |   | 12 |   |
| 24 | Independent Retail Store |   | 13 |   |
| 25 | Independent Retail Store |   | 14 |   |
| 26 | Independent Retail Store |   | 15 |   |
| 27 | Mail Order Distributor  |   | 1  |   |
| 28 | Mail Order Distributor  |   | 2  |   |
| 29 | Mail Order Distributor  |   | 3  |   |
| 30 | Mail Order Distributor  |   | 4  |   |
| 31 | Mail Order Distributor  |   | 5  |   |
| 32 | Mail Order Distributor  |   | 6  |   |
| 33 | Mail Order Distributor  |   | 7  |   |
| 34 | Mail Order Distributor  |   | 8  |   |
| 35 | Warehouse Retail Store  |   | 1  |   |
| 36 | Warehouse Retail Store  |   | 2  |   |
| 37 | Warehouse Retail Store  |   | 3  |   |
| 38 | Warehouse Retail Store  |   | 4  |   |
| 39 | Warehouse Retail Store  |   | 5  |   |

FIG. 11

| | A | B | C | D | E | F | G | H | I | J | K |
|---|---|---|---|---|---|---|---|---|---|---|---|
| 3 | Example of Prior Art | | | | | | | | | | |
| 4 | Orders for Products #1 and #2 | | | | | | | | | | |
| 5 | | | | | | | | | | | |
| 6 | Price Schedule | | | | | | | | | | |
| 7 | Units | Product 1 | Product 2 | | | | | | | | |
| 8 | 10,000 | 0.24 | 0.30 | | | | | | | | |
| 9 | 50,000 | 0.19 | 0.25 | | | | | | | | |
| 10 | 250,000 | 0.15 | 0.20 | | | | | | | | |
| 11 | | | | | | | | | | | |
| 12 | Clients | | Product 1 | Product 1 | Product 1 | Product 2 | Product 2 | Product 2 | Total | | |
| 13 | | | Units | Price | Amount | Units | Price | Amount | Amount | | |
| 14 | Independent Retail Store 1 | | 10,000 | $0.24 | $2,400 | 15,000 | $0.30 | $4,500 | $6,900 | | |
| 15 | Independent Retail Store 2 | | 10,000 | 0.24 | $2,400 | 15,000 | 0.30 | $4,500 | $6,900 | | |
| 16 | Independent Retail Store 3 | | 10,000 | 0.24 | $2,400 | 15,000 | 0.30 | $4,500 | $6,900 | | |
| 17 | Independent Retail Store 4 | | 10,000 | 0.24 | $2,400 | 15,000 | 0.30 | $4,500 | $6,900 | | |
| 18 | Independent Retail Store 5 | | 10,000 | 0.24 | $2,400 | 15,000 | 0.30 | $4,500 | $6,900 | | |
| 19 | Mail Order Distributor 1 | | 50,000 | 0.19 | $9,500 | 75,000 | 0.25 | $18,750 | $28,250 | | |
| 20 | Mail Order Distributor 2 | | 50,000 | 0.19 | $9,500 | 75,000 | 0.25 | $18,750 | $28,250 | | |
| 21 | Mail Order Distributor 3 | | 50,000 | 0.19 | $9,500 | 75,000 | 0.25 | $18,750 | $28,250 | | |
| 22 | Mail Order Distributor 4 | | 50,000 | 0.19 | $9,500 | 75,000 | 0.25 | $18,750 | $28,250 | | |
| 23 | Mail Order Distributor 5 | | 50,000 | 0.19 | $9,500 | 75,000 | 0.25 | $18,750 | $28,250 | | |
| 24 | Warehouse Retail Store 1 | | 250,000 | 0.15 | $37,500 | 375,000 | 0.20 | $75,000 | $112,500 | | |
| 25 | Warehouse Retail Store 2 | | 250,000 | 0.15 | $37,500 | 375,000 | 0.20 | $75,000 | $112,500 | | |
| 26 | Warehouse Retail Store 3 | | 250,000 | 0.15 | $37,500 | 375,000 | 0.20 | $75,000 | $112,500 | | |
| 27 | Total | | 1,050,000 | $0.16 | $172,000 | 1,575,000 | $0.22 | $341,250 | $513,250 | | |

FIG. 12

|    | A | B | C | D | E | F | G |
|----|---|---|---|---|---|---|---|
| 32 | Example of Virtual Client Discount Pricing Method | | | | | | |
| 33 | Orders for Products #1 and #2 | | | | | | |
| 34 | Product Volume | | | | | | |
| 35 | | | | | | | |
| 36 | Methodology: Product Volume (Amount) = Units x Price | | | | | | |
| 37 | | | | | | | |
| 38 | Price Schedule | | | | | | |
| 39 | Units | Product 1 | Product 2 | | | | |
| 40 | 250,000 | 0.15 | 0.20 | | | | |
| 41 | 500,000 | 0.14 | 0.19 | | | | |
| 42 | 1,000,000 | 0.13 | 0.18 | | | | |
| 43 | | | | | | | |
| 44 | Participant | Product 1 | Product 1 | Product 1 | Product 2 | Product 2 | Product 2 |
| 45 | | Units | Price | Amount | Units | Price | Amount |
| 46 | Independent Retail Store 1 | 10,000 | $0.13 | $1,300 | 15,000 | $0.18 | $2,700 |
| 47 | Independent Retail Store 2 | 10,000 | 0.13 | $1,300 | 15,000 | 0.18 | $2,700 |
| 48 | Independent Retail Store 3 | 10,000 | 0.13 | $1,300 | 15,000 | 0.18 | $2,700 |
| 49 | Independent Retail Store 4 | 10,000 | 0.13 | $1,300 | 15,000 | 0.18 | $2,700 |
| 50 | Independent Retail Store 5 | 10,000 | 0.13 | $1,300 | 15,000 | 0.18 | $2,700 |
| 51 | Mail Order Distributor 1 | 50,000 | 0.13 | $6,500 | 75,000 | 0.18 | $13,500 |
| 52 | Mail Order Distributor 2 | 50,000 | 0.13 | $6,500 | 75,000 | 0.18 | $13,500 |
| 53 | Mail Order Distributor 3 | 50,000 | 0.13 | $6,500 | 75,000 | 0.18 | $13,500 |
| 54 | Mail Order Distributor 4 | 50,000 | 0.13 | $6,500 | 75,000 | 0.18 | $13,500 |
| 55 | Mail Order Distributor 5 | 50,000 | 0.13 | $6,500 | 75,000 | 0.18 | $13,500 |
| 56 | Warehouse Retail Store 1 | 250,000 | 0.13 | $32,500 | 375,000 | 0.18 | $67,500 |
| 57 | Warehouse Retail Store 2 | 250,000 | 0.13 | $32,500 | 375,000 | 0.18 | $67,500 |
| 58 | Warehouse Retail Store 3 | 250,000 | 0.13 | $32,500 | 375,000 | 0.18 | $67,500 |
| 59 | Total | 1,050,000 | $0.13 | $136,500 | 1,575,000 | $0.18 | $283,500 |

FIG. 13A

| | A | B | C | D | E | F | G |
|---|---|---|---|---|---|---|---|
| 61 | Example of Virtual Client Discount Pricing Method | | | | | | |
| 62 | Orders for Products #1 and #2 | | | | | | |
| 63 | Group Discount | | | | | | |
| 64 | | | | | | | |
| 65 | Methodology: Group Discount = Units x Group Discount Rate | | | | | | |
| 66 | | | | | | | |
| 67 | Group Discount | Group Discount | | | | | |
| 68 | Amount | Rate | | | | | |
| 69 | $100,000 | -2.00% | | | | | |
| 70 | $250,000 | -3.25% | | | | | |
| 71 | $500,000 | -3.50% | | | | | |
| 72 | $750,000 | -4.00% | | | | | |
| 73 | | | | | | | |
| 74 | Group Discount | Product 1 | Product 2 | Total | Discount | Group | |
| 75 | | Amount | Amount | Amount | Rate | Discount | |
| 76 | Independent Retail Store 1 | 1,300 | $2,700 | $4,000 | -3.25% | -$130 | |
| 77 | Independent Retail Store 2 | 1,300 | $2,700 | $4,000 | -3.25% | -$130 | |
| 78 | Independent Retail Store 3 | 1,300 | $2,700 | $4,000 | -3.25% | -$130 | |
| 79 | Independent Retail Store 4 | 1,300 | $2,700 | $4,000 | -3.25% | -$130 | |
| 80 | Independent Retail Store 5 | 1,300 | $2,700 | $4,000 | -3.25% | -$130 | |
| 81 | Mail Order Distributor 1 | 6,500 | $13,500 | $20,000 | -3.25% | -$650 | |
| 82 | Mail Order Distributor 2 | 6,500 | $13,500 | $20,000 | -3.25% | -$650 | |
| 83 | Mail Order Distributor 3 | 6,500 | $13,500 | $20,000 | -3.25% | -$650 | |
| 84 | Mail Order Distributor 4 | 6,500 | $13,500 | $20,000 | -3.25% | -$650 | |
| 85 | Mail Order Distributor 5 | 6,500 | $13,500 | $20,000 | -3.25% | -$650 | |
| 86 | Warehouse Retail Store 1 | 32,500 | $67,500 | $100,000 | -3.25% | -$3,250 | |
| 87 | Warehouse Retail Store 2 | 32,500 | $67,500 | $100,000 | -3.25% | -$3,250 | |
| 88 | Warehouse Retail Store 3 | 32,500 | $67,500 | $100,000 | -3.25% | -$3,250 | |
| 89 | Total | $136,500 | $283,500 | $420,000 | | -$13,650 | |

| | A | B | C | D | E | F | G | H |
|---|---|---|---|---|---|---|---|---|
| 92 | Example of Virtual Client Discount Pricing Method | | | | | | | |
| 93 | Orders for Products #1 and #2 | | | | | | | |
| 94 | Adjuster | | | | | | | |
| 95 | | | | | | | | |
| 96 | Adjuster Rate Schedule | | Methodology: Adjuster = Amount x Adjuster Rate | | | | | |
| 97 | | | | | | | | |
| 98 | Participant Adjuster Amount | | | Account Adjuster (Product N) Amount | | | | |
| 99 | $2,500 | 10.0% | | $2,500 | Minimum | 10.0% | | |
| 100 | $10,000 | 5.0% | | | | | | |
| 101 | $25,000 | 0.0% | | | | | | |
| 102 | $50,000 | -5.0% | | | | | | |
| 103 | $100,000 | -7.5% | | | | | | |
| 104 | $250,000 | -10.0% | | | | | | |
| 105 | | | | | | | | |
| 106 | Adjuster can apply to both the participant and an individual account (Product N) | | | | | | | |
| 107 | | | | | | | | |
| 108 | | | | | | | | |
| 109 | Participant | | Product 1 | Product 2 | Total | Participant | Account | |
| 110 | | | Amount | Amount | Amount | Adjuster | Adjuster | Adjuster |
| 111 | Independent Retail Store | | $1,300 | $2,700 | $4,000 | | 10.0% | $400 |
| 112 | Independent Retail Store | | 1,300 | 2,700 | 4,000 | | 10.0% | $400 |
| 113 | Independent Retail Store | | 1,300 | 2,700 | 4,000 | | 10.0% | $400 |
| 114 | Independent Retail Store | | 1,300 | 2,700 | 4,000 | | 10.0% | $400 |
| 115 | Independent Retail Store | | 1,300 | 2,700 | 4,000 | | 10.0% | $400 |
| 116 | Mail Order Distributor | | 6,500 | 13,500 | 20,000 | 0.0% | | $0 |
| 117 | Mail Order Distributor | | 6,500 | 13,500 | 20,000 | 0.0% | | $0 |
| 118 | Mail Order Distributor | | 6,500 | 13,500 | 20,000 | 0.0% | | $0 |
| 119 | Mail Order Distributor | | 6,500 | 13,500 | 20,000 | 0.0% | | $0 |
| 120 | Mail Order Distributor | | 6,500 | 13,500 | 20,000 | 0.0% | | $0 |
| 121 | Warehouse Retail Store | | 32,500 | 67,500 | 100,000 | -10.0% | | -$10,000 |
| 122 | Warehouse Retail Store | | 32,500 | 67,500 | 100,000 | -10.0% | | -$10,000 |
| 123 | Warehouse Retail Store | | 32,500 | 67,500 | 100,000 | -10.0% | | -$10,000 |
| 124 | Total | | $136,500 | $283,500 | $420,000 | | | -$28,000 |

|     | A | B | C | D | E | F |
|-----|---|---|---|---|---|---|
| 126 | Example of Virtual Client Discount Pricing Method | | | | | |
| 127 | Orders for Products #1 and #2 | | | | | |
| 128 | Total Fee | | | | | |
| 129 | | | | | | |
| 130 | | | | | | |
| 131 | Total Fee = Product Volume Fee + Group Fee Discount + Fee Adjuster | | | | | |
| 132 | | | | | | |
| 133 | Total Fee | Product Volume | Group Discount | Adjuster | Total Amount | |
| 134 | | | | | | |
| 135 | Independent Retail Store | $4,000 | -$130 | $400 | $4,270 | |
| 136 | Independent Retail Store | $4,000 | -$130 | $400 | $4,270 | |
| 137 | Independent Retail Store | $4,000 | -$130 | $400 | $4,270 | |
| 138 | Independent Retail Store | $4,000 | -$130 | $400 | $4,270 | |
| 139 | Independent Retail Store | $4,000 | -$130 | $400 | $4,270 | |
| 140 | Mail Order Distributor | $20,000 | -$650 | $0 | $19,350 | |
| 141 | Mail Order Distributor | $20,000 | -$650 | $0 | $19,350 | |
| 142 | Mail Order Distributor | $20,000 | -$650 | $0 | $19,350 | |
| 143 | Mail Order Distributor | $20,000 | -$650 | $0 | $19,350 | |
| 144 | Mail Order Distributor | $20,000 | -$650 | $0 | $19,350 | |
| 145 | Warehouse Retail Store | $100,000 | -$3,250 | -$10,000 | $86,750 | |
| 146 | Warehouse Retail Store | $100,000 | -$3,250 | -$10,000 | $86,750 | |
| 147 | Warehouse Retail Store | $100,000 | -$3,250 | -$10,000 | $86,750 | |
| 148 | Total | $420,000 | -$13,650 | -$28,000 | $378,350 | |

FIG. 13D

|     | A | B | C | D | E | F |
| --- | --- | --- | --- | --- | --- | --- |
| 151 | SUMMARY | | | | | |
| 152 | Example of Prior Art | | | | $513,250 | |
| 153 | Virtual Client Discount Pricing Method | | | | $378,350 | |
| 154 | | | | | | |
| 155 | Differential | | | | $134,900 | |

FIG. 13E

VIRTUAL CLIENT DISCOUNT PRICING

FIELD OF INVENTION

The present invention of a Virtual Client Discount Pricing (VCDP) system and method pertains to group purchasing of goods and/or services, e.g., investment management services, by a virtual client, comprising a group of participants (clients), having individual accounts with aggregate utilization discount pricing.

DESCRIPTION OF THE RELATED ART

In a competitive market, volume purchasers receive better per-unit prices than smaller buyers do. Four examples demonstrate this effect: soft-drinks, such as Coca-Cola; telephone service, such as AT&T long distance; electric power, such as PG&E; and health insurance, such as IBM group insurance (true group), IEEE group insurance (loose association of independent members) and individual insurance.

Regarding soft drinks, Wal-Mart pays less than an individual store per can of Coca-Cola. Although the actual cans purchased are the same, a large vendor such as Wal-Mart provides greater administration and distribution for Coca-Cola. That is why Wal-Mart pays less than an individual store per can of Coca-Cola. Upon scrutiny though, this does not explain all of the cost reduction. The fact is that the mere buying power or volume difference accounts for a substantial part of the discount received.

Telephone service and electric power facilitate analysis because the distribution costs have been thoroughly analyzed, and are now usually paid for separately. Thus, it is very close to reality that "a call is a call is a call" or "a kilowatt-hour is a kilowatt-hour is a kilowatt-hour." Still, the large purchasers (e.g. IBM) receive substantial discounts compared to individual buyers of the same services.

Health insurance is frequently referred to as a great success in group buying. When the individuals are grouped in a corporate entity, this is true because the client is really the company. Affiliation type organizations, such as professional associations similar to the IEEE, provide much less of a group reduction to the individual. It is well known that small firms and individuals pay very high prices.

Investment Management Industry

The concept of volume purchasing discounts holds true for the investment management industry. The fees that can be negotiated by 1 company with $10 million to invest are much less than that of 100 individuals, each with $100,000 to invest. It is also clear that the fee discount is dominated by the competitive nature of the market, in addition to a small administrative cost. Also, clearly, "a dollar is a dollar is a dollar."

The investment management industry is a service business that provides advice about investments in securities for a fee. The investment management industry comprises many different types of organizations that manage the investments of others. These organizations include stand-alone investment management companies, brokerage firms, banks, insurance companies, partnerships and individuals. The clients they serve are financial institutions, investment companies, pension funds serving corporations, governments and unions, endowments and foundations, as well as individuals.

The current industry model for billing investment management services is to bill each client for the assets in their account(s) and according to a fee schedule by product that is usually based upon the amount of assets. In most cases, clients will use a fixed-rate fee schedule although some investment managers offer a performance-based fee schedule.

Most investment managers are willing to negotiate fees that are less than their published fee schedules for most asset classes. Typically investment managers will negotiate for single client relationships that are greater than $50 million. The negotiating of investment management fees is influenced by several major factors.

An individual product's performance and risk characteristics

Product maturity with respect to its historical use

Supply and demand

Relationship between the investment manager and the client

Size of assignment with larger sizes receiving lower fees

Multiple accounts by the same client may also earn additional discounts

A number of specific pieces of prior art will now be discussed:

1. U.S. Pat. No. 5,794,219 titled "Method of Conducting an On-Line Auction with Bid Pooling." This patent relates to a method of conducting an on-line auction that permits individual bidders to pool bids during a bidding session. This reference relates to a pool of bidders who decide to participate in a reverse auction whereby they get together as a group and offer a price for a group of products or services.

2. U.S. Pat. No. 5,822,736 titled "Variable Margin Pricing System." This patent relates to a variable margin pricing system and method that generates retail prices based on customer price sensitivity. This variable pricing system reference creates price margins for products that vary based upon the customers' sensitivity to prices.

3. U.S. Pat. No. 5,303,297 titled "Dynamic Pricing Method and Apparatus for Communication." This patent relates to a communication system service billing arrangement that adapts to a system loading in real time. This reference allows the clients to use a variable pricing strategy based upon the utilization level of the provider's services. The methodology will determine usage during a specified time period and establish a rate for that period. This reference refers to a communication system where the user can see real time rates that fluctuate and decide to execute a transaction at that specific point in time.

4. U.S. Pat. No. 4,090,034 titled "Usage-Sensitive Billing Arrangement for Private Branch Exchange Subscribers." This patent relates to an accounting center which computes usage-sensitive sensitive billing data for local calls based on the distance between calling and called subscribers, and call duration. This reference computes usage sensitive billing for an individual client based upon the distance between a caller and the recipient of the call, and the duration.

5. An article in the Journal of Pension & Investments, Fee Concerns Divide Managers, Sponsors, Phil Levine, Sep. 15, 1997. This article describes the Current Industry Pricing Model for investment management fees.

SUMMARY OF THE INVENTION

The present invention comprises a Virtual Client Discount Pricing system and method that allows a number of individuals or entities, referred to as participants, to create a virtual client for the purpose of purchasing, leasing or renting of products and services, especially investment management services. The plurality of participants gather together to form the virtual client. In general, the virtual client is created to enable the participants to access goods or services from a provider, or numerous providers, using a discounted rate. In this manner, when the participants of the virtual client access goods or services from the provider, each of the participants receives a discounted rate from the provider using the virtual client, as compared to each of the participants individually accessing goods or services from the provider.

The virtual client may comprise a combination of previously un-aggregated participants who gather together primarily or specifically for the purpose of forming the virtual client, i.e., primarily or specifically for the purpose of achieving the discounted rate. The virtual client may also be formed by participants who are affiliates of a central organization.

A third party, referred to as a virtual client administrator, may create or assist in the creation of the virtual client, and may also administrate or manage the virtual client. The virtual client administrator may be a participant in the virtual client or may be a provider of goods and services to the virtual client.

The present invention utilizes a Virtual Client Discount Pricing method for assessing fees or prices to each of the accounts of the participants in the virtual client. The accounts are held by a plurality of participants in a virtual client, wherein each of the participants has at least one account. If the provider offers a plurality of products, then typically each account will be assigned to a product category.

The Virtual Client Discount Pricing method adapts a variable pricing strategy based upon the aggregate utilization level of a group of separately managed accounts in the virtual client. As the funds vary, the participants in the group are provided with a rate or fee (or price) for a specified period, usually quarterly. The Virtual Client Discount Pricing methodology calculates an aggregate utilization rate for the fee. Pricing may be determined for multiple products; each product is preferably grouped separately and a price is determined on a product basis for the group. The system then computes the fee for each participant for each individual account based upon the aggregate product volume fee, the group discount rate, and an adjuster, and communicates the fee electronically and/or in written form to the participant.

The VCDP method first calculates a product volume fee for each account, preferably by product category. If the provider offers only one product, or if each of the participant accounts only have one product, then the method simply calculates a product volume fee for each account, without regard to product category.

The method then determines a group discount for the virtual client. The group discount may be based on market value in all accounts for all product categories in the virtual client. Here the method uses a discount schedule, e.g., a company-wide or standardized fee or price schedule, and the market value of all of the accounts contained in the virtual client are referenced against or applied to the discount schedule.

The method may then determine an adjuster for each account in the virtual client. The adjuster accounts for differences in volume or assets among the various participants in the virtual client. In the preferred methodology, for each respective account, the adjuster is based on the market value of the respective participant in the virtual client.

The method then calculates a fee for each respective account based on the product volume fee for the respective account, the group discount, and the adjuster for the respective account. According to the present invention, generally all of the participants receive a discounted rate from the provider using the virtual client as compared to each of the participants individually accessing goods or services from the provider.

The method then generates invoices to each of the participants based on the calculated fee. The fees for the separately managed accounts are derived from the Virtual Client Discount Pricing method and then entered into a file on the billing system. The billing system matches the fee with the participant profile and generates a bill. This bill is forwarded to the participant or any other party authorized to pay the fee, electronically and/or in written form.

This methodology effectively lowers charges for each of the participants. In particular, VCDP lowers prices for a group of participants on a product specific basis and on group wide usage basis. Additionally, VCDP enables the service provider to set a minimum profit level for each participant as well as the group.

1. VCDP is a pricing methodology that can be used when a service provider offers discounts based upon aggregate utilization.

2. VCDP is a group purchasing methodology whereby a virtual client is created from a group of participants for the purpose of achieving discounted fees or prices for the participants based on the aggregate utilization of the participants.

3. VCDP is unique in that it is a multi-factor approach. VCDP utilizes a combination of three factors, product volume, group discount and an adjuster, in calculating a discount that is suited to each participant. All other methodologies use a single factor such as usage or margin for a single client.

4. VCDP is designed to enable the service provider to set a minimum profit for each participant as well as the group (virtual client). The adjuster can be changed so that group discounts can not outweigh the provider's interest.

5. VCDP is also a marketing tool. By aligning the participants' interests with that of the provider's, the participants are motivated to encourage others to join in order to decrease their own expenses. VCDP theoretically reduces the marketing expenses and passes the savings along to the participants in rate reductions.

BRIEF DESCRIPTION OF THE DRAWINGS

A better understanding of the present invention can be obtained when the following detailed description of the preferred embodiment is considered in conjunction with the following drawings, in which:

FIG. 8B, comprising FIGS. 8B(1) and 8B(2), is a flowchart detailing the Virtual Client Discount Pricing method with respect to the pricing methodology for investment management services according to the present invention;

FIG. 9 is a spreadsheet illustrating the current industry model (prior art) with respect to investment management services;

FIG. 10, comprising FIGS. 10A–10M, is a spreadsheet illustrating the operation of the Virtual Client Discount Pricing method in conjunction with a preferred embodiment with respect to investment management services;

FIG. 11 illustrates the formation of a virtual client from a group of individual participants;

FIG. 12 is a diagram illustrating the Current Industry Pricing Model (prior art) for a group of clients with respect to purchasing multiple products; and FIG. 13, comprising FIGS. 13A–13W is a spreadsheet illustrating the Virtual Client Discount Pricing method for a group of participants with respect to purchasing multiple products.

DESCRIPTION OF THE EMBODIMENTS

Virtual Client System

Figure 1:
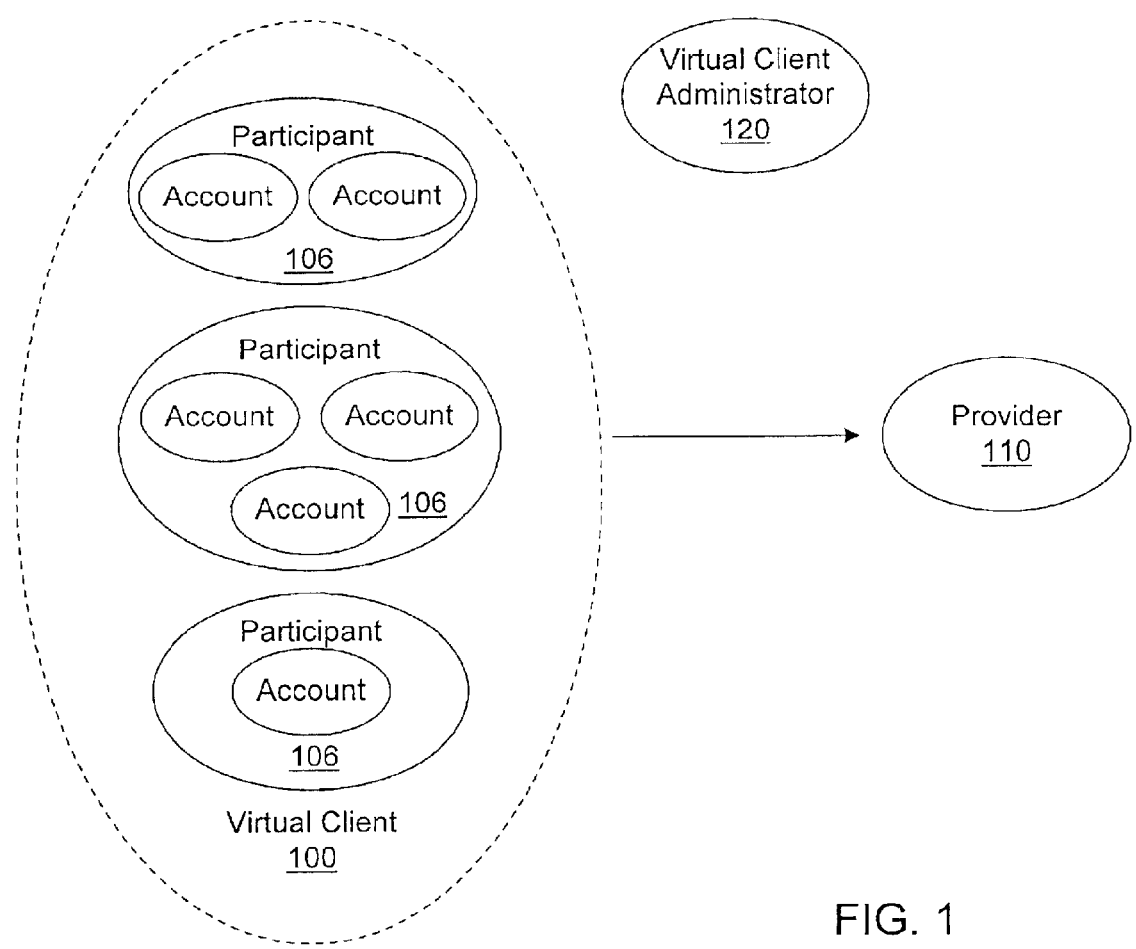
FIG. 1 illustrates the interrelation between a virtual client, a provider and a virtual client administrator.

FIG. 1 illustrates a virtual client 100 accessing goods or services from a provider 110. As shown, the virtual client 100 comprises a plurality of participants 106. FIG. 1 illustrates a virtual client 100 with 3 participants 106 for ease of illustration, it being noted that the virtual client 100 will typically comprise hundreds or thousands (or more) of participants 106. Each of the participants 106 has one or more accounts with a provider 110. The provider 110 offers goods or services to the participants 106. The provider 110 may comprise a single provider, or a plurality of providers acting together. A virtual client administrator 120 may be involved with creating and/or managing the virtual client 100. A participant 106 may operate as the virtual client administrator 120, or the provider 110 may operate as the virtual client administrator 120. The virtual client administrator 120 may also be a third party.

Figure 2:
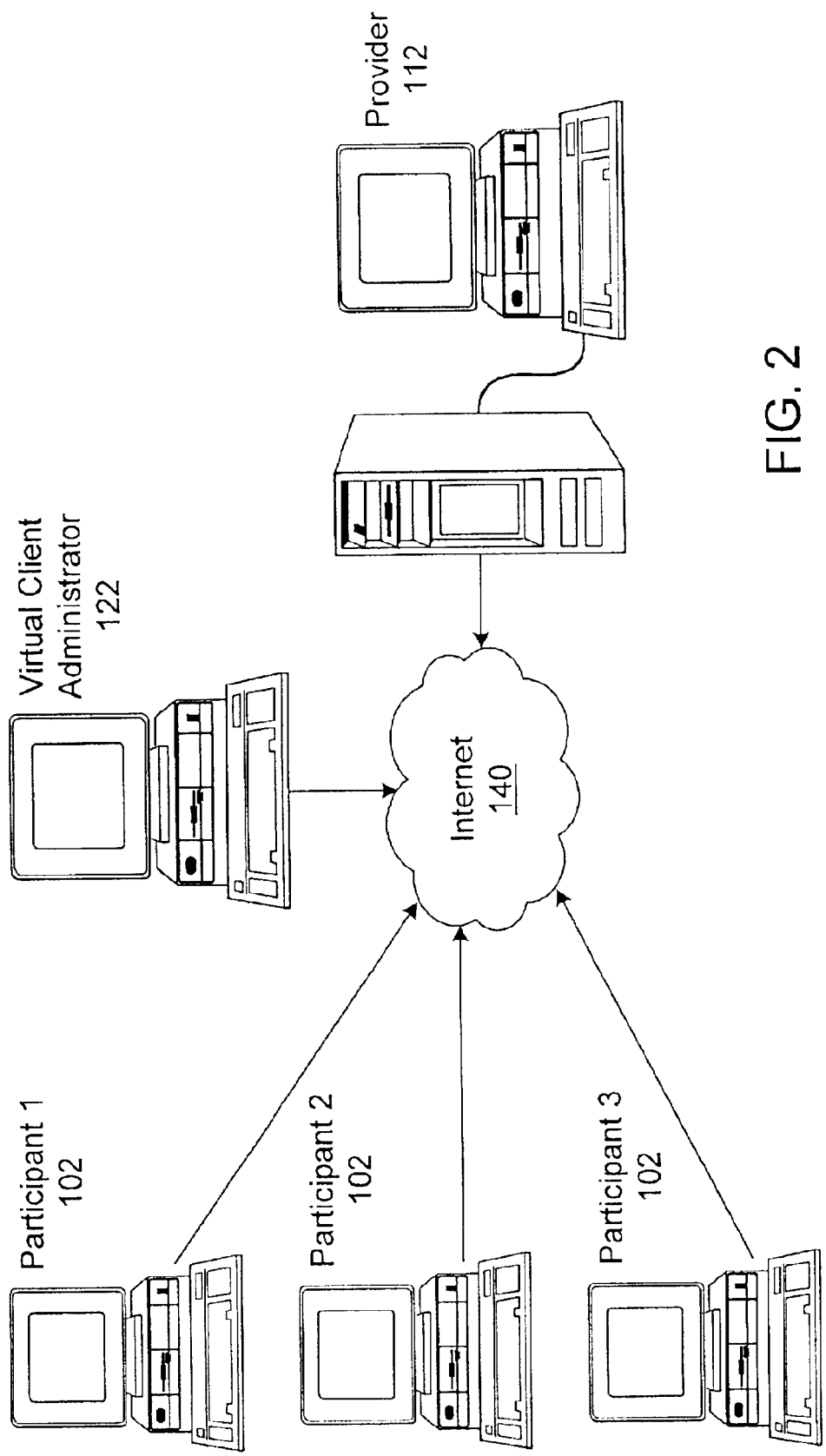
FIG. 2 illustrates a virtual client system including a virtual client, a provider and a virtual client administrator utilizing a network such as the Internet.

FIG. 2 illustrates a system where each of the participants 106 has a computer system 102 which is connected to a computer system 112 of the provider 110 through a network 140, such as the Internet. The network 140 may also be a LAN or other type of WAN. Each of the participants 106 may access goods and/or services from the provider 110 using the computer systems 102. The virtual client administrator 120 includes a computer system 122 which may also be connected through the network 140 to the provider 110 and/or each of the participants 106. As noted above, the virtual client administrator 120 may also be the provider 110 or a participant 106.

As discussed further below, one or more of the computer systems of the provider 110 or the virtual client administrator 120 may execute software according to the present invention for implementing a Virtual Client Discount Pricing method. The Virtual Client Discount Pricing method is used for assessing fees or prices to accounts of the participants in the virtual client. It is also noted that a plurality of computer systems, such as systems 122 and 112, may implement different components of the Virtual Client Discount Pricing method in a distributed system.

The respective computer system(s) 102, 112, and 122 which implement the Virtual Client Discount Pricing method, or manage the virtual client, preferably include a memory medium on which computer programs according to the present invention are stored. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102, 112 and 122 may take various forms, including a personal computer system, mainframe computer system, workstation, network appliance, Internet appliance, or other device. In general, the term "computer system" can be broadly defined to encompass any device having a processor which executes instructions from a memory medium.

As noted above, the memory medium preferably stores a software program for implementing the Virtual Client Discount Pricing method of the present invention. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium comprises a means for creating and executing the software program according to the methods or flowcharts described below.

Creation and Management of the Virtual Client

The virtual client is created by a plurality of individuals or entities, referred to as participants, who gather together to form the virtual client. In general, the virtual client is created to enable the participants to access goods or services from a provider, or numerous providers, or numerous providers simultaneously, using a discounted rate. In this manner, when the virtual client, or the participants comprising the virtual client, access goods or services from the provider, each of the participants receives a discounted rate from the provider using the virtual client, as compared to each of the participants individually accessing goods or services from the provider.

The virtual client may comprise a combination of previously un-aggregated participants, i.e., participants who gather together primarily or specifically for the purpose of forming the virtual client, i.e., primarily or specifically for the purpose of achieving the discounted rate. The term "previously un-aggregated participants" may refer to participants who, but for the group discount obtained by the virtual client entity, would not have joined together.

The virtual client 100 may also be formed by participants who are affiliates of a central organization. The purpose of this type of virtual client is to serve organizations that have an established relationship, such as international unions and their member locals, charitable foundations and their affiliates, as well as other groups of related individuals that may come together specifically to participate in the virtual client arrangement.

A virtual client administrator, which may be a third party, may also create or assist in the creation of the virtual client, wherein the virtual client administrator may not be a participant in the virtual client. The virtual client may also be formed by participants utilizing the Internet. For example, various individuals or entities may register to participate in a virtual client using the Internet. The virtual client administrator involved with creation of the virtual client may create or facilitate the Internet site to register the participants. The virtual client administrator may also negotiate with various organizations or entities to achieve a discounted rate for the participants in the virtual client, based on the total volume or aggregate utilization of the virtual client. The participants, in turn, receive a discounted rate or fee for goods or services using the discount available to the virtual client.

A virtual client, or a virtual client administrator that has formed or assisted in formation of a virtual client, may charge a fee to one or more of the participants, typically all of the participants. The fee may be a one-time fee and/or an ongoing fee, and may be categorized as an administrative expense. The fee may be based on the amount of discount received by a respective participant. The present patent holder may also be entitled to receive a fee that may be, but is not limited to, one time, ongoing, per member or participant and/or percentage of transaction, etc.

The virtual client administrator, which may be a different third party or entity than the party who organized the virtual client, may also manage the virtual client on behalf of the participants. The virtual client administrator will typically assess a management fee to the participants for this service.

As noted above, the virtual client, e.g., the virtual client administrator, then negotiates on behalf of the participants for an appropriate discount, e.g., using the Virtual Client Discount Pricing method. For example, the virtual client administrator may negotiate with one or more specific investment management providers for a discount for the virtual client. The participant is always free to pursue his/her own providers as well.

Virtual Client Discount Pricing Overview

1. The virtual client may negotiate the following parameters which will be used in the Virtual Client Discount Pricing method in order to determine a fee or price for each of the participants per account:

Product volume

Group discount

Adjuster (Participant or Account Adjuster)

2. After the virtual client has been formed, the virtual client or participants may elect to hire the service provider and enter into a contractual relationship. The contract with each participant, or all of the participants, will be negotiated with the provider. The standardized portion of the contract will be the Virtual Client Discount Pricing method that had been previously negotiated by the virtual client.

3. Once one or more of the participants have entered into a contract with the service provider, an account is then opened and funded on behalf of the respective participants.

Virtual Client Discount Pricing Method

The provider, or the virtual client administrator, calculates fees (or discounts of fees) according to the Virtual Client Discount Pricing method for each of the accounts for each of the participants. In one embodiment, the provider calculates fees based on the Virtual Client Discount Pricing method and provides invoices or bills to each of the participants. In another embodiment, the virtual client administrator operates to calculate actual fees and discounts and either 1) provides this information to the provider or 2) bills each of the participants directly. This second embodiment removes the relatively small burden and overhead from the provider of having to compute fees according to the Virtual Client Discount Pricing method.

The Virtual Client Discount Pricing method is an aggregate utilization methodology that preferably utilizes a combination of generally two or more of the following three factors: product volume, group discount and adjuster. The Virtual Client Discount Pricing method calculates a discount that is suited to each participant. The VCDP is a multi-factor approach that includes, but is not limited to, the previous three factors. The provider may choose to base the discounts on any measurement such as fees, assets, revenues, etc. that it chooses to use. FIGS. 3–6 describe the preferred embodiment of the Virtual Client Discount Pricing method with respect to an investment management system.

FIGS. 3–6: Virtual Client Discount Pricing Method

FIGS. 3–6 are flowchart diagrams illustrating operation of the Virtual Client Discount Pricing method according to the preferred embodiment of the present invention. FIGS. 3–7 illustrate operation of the Virtual Client Discount Pricing Method with respect to the provider being an investment management provider. However, it is noted that the present invention may be readily applied to other types of providers, e.g., providers of other types of goods and/or services. Thus FIGS. 3–6 are exemplary.

In an investment management example, it is noted that the terms "volume", "market value", and "assets" may generally be considered synonymous, each term representing the amount of dollars or assets contained, for example, within an account, or group of accounts. In a non-investment management example, i.e., a generalized goods and services example, the term "volume" may connote a number of units, wherein the term "market value" may connote the dollar value of those number of units. In the present application, the terms "volume", "market value," "assets" and other such terms are intended to include or encompass various notions of the amount of a good or service or account, such as number of units, market value of those units, market value of services provided, and total assets, among others.

Figures 3, 4:
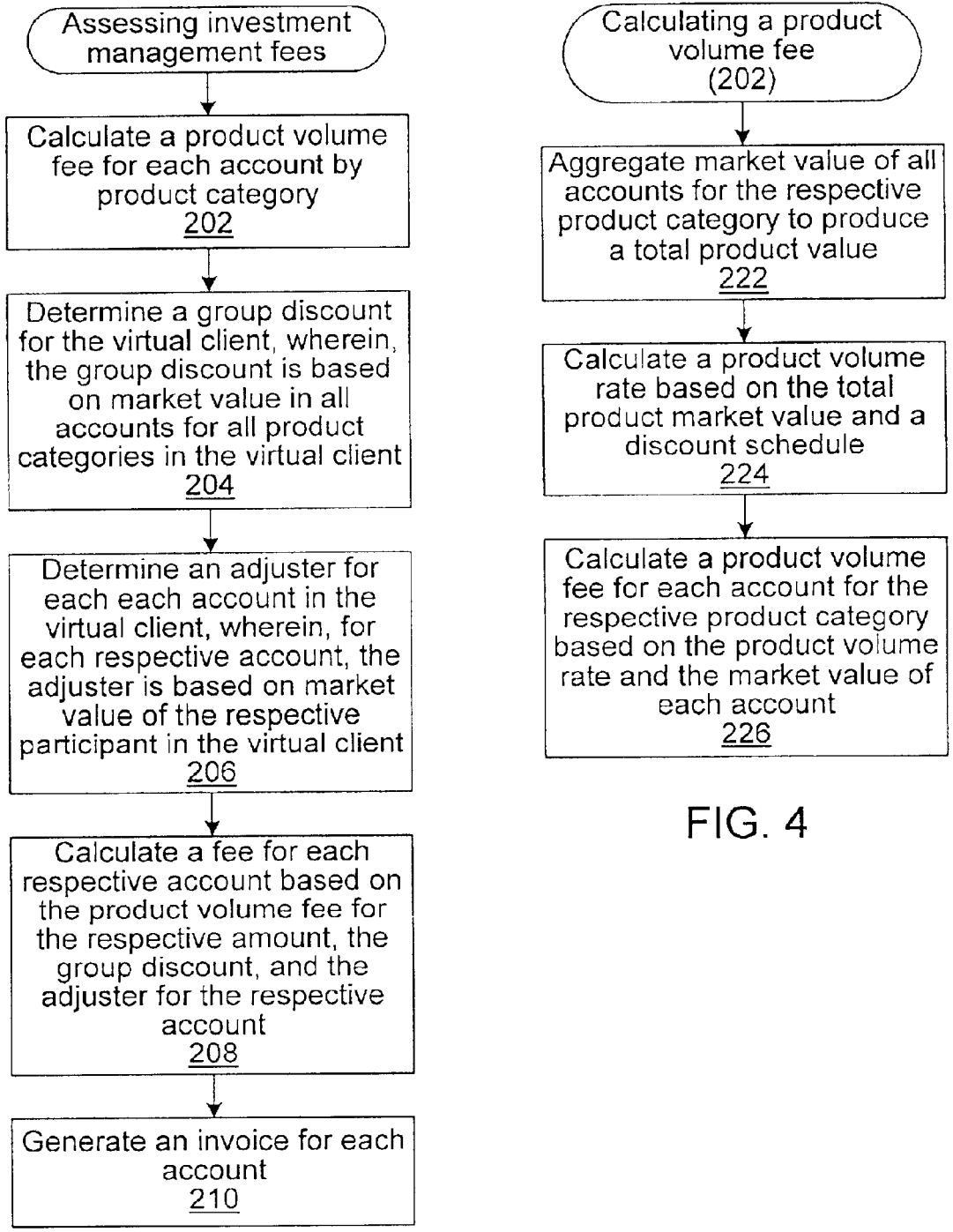
FIG. 3 is a flowchart diagram illustrating operation of the Virtual Client Discount Pricing method with respect to the provider being an investment management provider.
FIG. 4 is a flowchart diagram illustrating calculation of a product volume fee for each account by product category performed in step 202 of FIG. 3.

As shown in the embodiment of FIG. 3, the present invention includes a method for assessing investment management fees to accounts, wherein the accounts are maintained, in this example, in an investment management system. The accounts are held by a plurality of participants in a virtual client, wherein each of the participants has at least one account. If the provider offers a plurality of products, then typically each account will be assigned to a product category. The method of assessing fees may operate as follows.

In step 202 the method calculates a product volume fee for each account, preferably by product category. If the provider 110 offers only one product, or if each of the participant accounts only have one product, then the method simply calculates a product volume fee for each account, without regard to product category. Calculation of the product volume fee may be performed using a discount schedule and is discussed with reference to the flowchart of FIG. 4.

In step 204 the method determines a group discount for the virtual client. The group discount may be based on market value in all accounts for all product categories in the virtual client. Here the method uses a discount schedule. In general, it is assumed that the provider maintains a company-wide or standardized fee or price schedule, although this may not be the case. The market value of all of the accounts contained in the virtual client are referenced against or applied to the discount schedule. The discount schedule may be based upon a standard fixed rate fee schedule that is applicable to each product, such as U.S. large cap growth, U.S. small cap value and U.S. fixed income, among others. Step 204 is discussed further with regard to the flowchart of FIG. 5.

In step 206 the method may determine an adjuster for each account in the virtual client. The determination of the adjuster may optionally not be performed for some virtual clients. The adjuster accounts for differences in volume or assets among the various accounts or participants in the virtual client. Thus larger accounts hence may receive larger discounts than smaller accounts. Step 206 is discussed further with respect to the flowchart of FIG. 6.

In the preferred methodology, for each respective account, the adjuster is based at least on the market value of the respective account in the virtual client. The above methodology contemplates that the adjuster may be based on each individual account, in which case the adjuster may vary across a plurality of accounts of a participant. The above methodology also contemplates that the adjuster may be based on the market value of all accounts of a participant in the virtual client, wherein the adjuster is the same for each of a plurality of accounts of a participant, i.e., the adjuster is the same for each account of a participant (the currently preferred embodiment). Thus the adjuster may be determined (and applied) on a per account basis or on a per participant basis. As described below with respect to FIG. 6, the adjuster is based on market value of the respective account in the virtual client and a discount schedule.

In step 208 the method calculates a fee (total fee or account fee) for each respective account based on the product volume fee for the respective account, the group discount, and the adjuster for the respective account. In the preferred embodiment, for each respective account, the fee is calculated as the sum of the product volume fee for the respective account, the group discount, and the adjuster for the respective account. The method thus operates to assess investment management fees to each of the accounts for each of the participants. According to the present invention, at least a subset of the participants, generally all of the participants, receive a discounted rate from the provider using the virtual client as compared to each of the participants individually accessing goods or services from the provider.

In step 210, the method generates invoices to each of the participants based on the calculated fee. The fees for the separately managed accounts are derived from the Virtual Client Discount Pricing method and then may be entered into a file on the billing system. The billing system matches the fee with the participant profile and generates a bill. This bill is forwarded to the participant or any other party authorized to pay the fee, electronically and/or in written form.

As noted above, the method of FIG. 3 may be implemented by the provider 110 or the virtual client administrator 120, or a combination thereof.

FIG. 4 illustrates more detail regarding one embodiment of step 202 of FIG. 3. As shown, for each respective product category, the method of calculating a product volume fee operates as follows.

In step 222 the method aggregates the market value of all accounts in the virtual client for the respective product category to produce a product volume, also called a total product market value. In an investment management example, step 222 operates to aggregate or sum the total product market value (product volume) of all accounts for a respective investment product, such as U.S. large cap growth, U.S. small cap value and U.S. fixed income, among others. Additionally, the product may be a separately managed investment account, a mutual fund, or a family of mutual funds.

In step 224 the method calculates a product volume rate based on the total product market value and a discount schedule. Here the method applies the total product market value to the discount schedule to determine the product volume rate that should apply. Here it is presumed that the discount schedule provides a more favorable product volume rate as the total product market value increases.

In step 226 the method calculates a product volume fee for each account for the respective product category based on the product volume rate and the market value of each account. The product volume fee for each account for the respective product category is preferably calculated as the product volume rate multiplied by the market value of each account.

The above method is performed for each product category.

Figure 5:
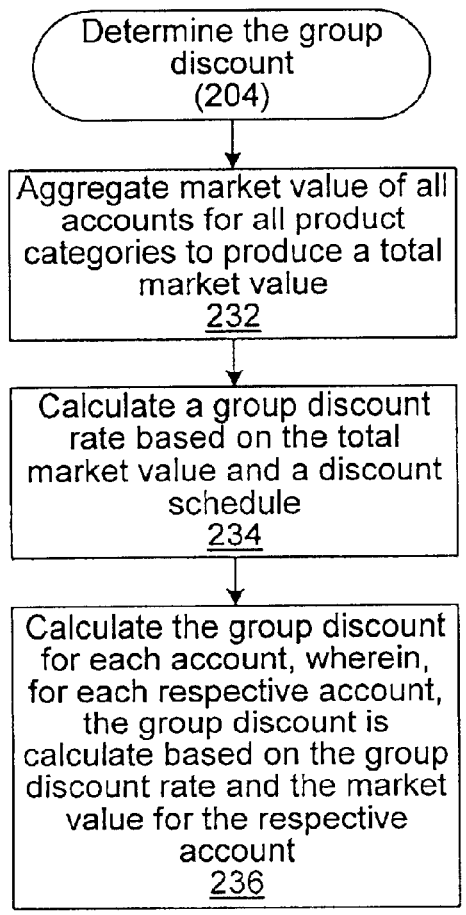
FIG. 5 is a flowchart diagram illustrating determination of a group discount for the virtual client performed in step 204 of FIG. 3.

FIG. 5 illustrates more detail regarding one embodiment of step 204 of FIG. 3. As shown, the method of determining the group discount operates as follows.

In step 232 the method aggregates the market value of all accounts for all product categories to produce a total market value. The total market value is hence the total value of all accounts for all participants in the virtual client.

In step 234 the method calculates a group discount rate based on the total market value and a discount schedule. Here it is presumed that the discount schedule provides a more favorable group discount rate as the total market value of the virtual client increases.

In step 236 the method calculates the group discount for each account. For each respective account, the group discount is calculated based on the group discount rate and the market value for the respective account. In the preferred embodiment, the group discount for each account is calculated as the group discount rate multiplied by the market value for the respective account.

Figure 6:
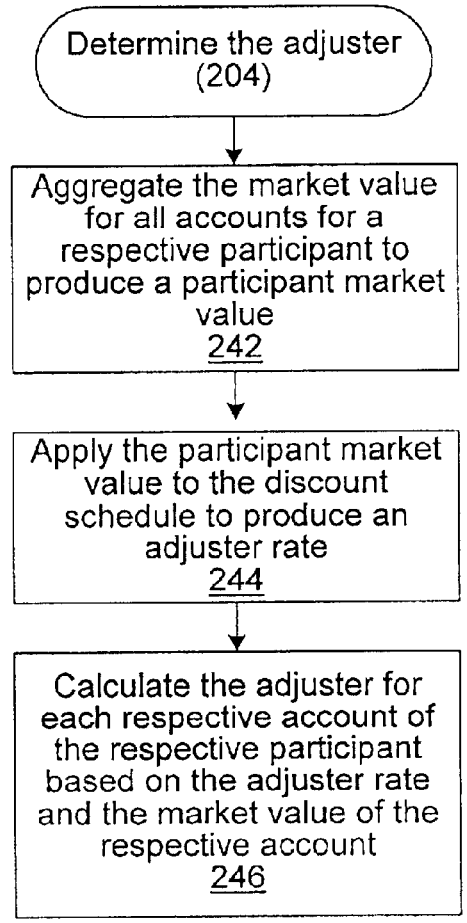
FIG. 6 is a flowchart diagram illustrating determination of an adjuster for each account in the virtual client performed in step 206 of FIG. 3.

FIG. 6 illustrates more detail regarding one embodiment of step 206 of FIG. 3. As shown, for a respective participant, the method of determining the adjuster operates as follows.

In step 242 the method aggregates the market value of all accounts for a respective participant to produce a participant market value.

In step 244 the method applies the participant market value to a discount schedule to produce an adjuster rate.

In step 246 the method calculates the adjuster for each respective account of the respective participant based on the adjuster rate and the market value of the respective account.

As discussed above, the adjuster may be an account adjuster calculated independently for each account basis based on market value in an account of the respective participant in the virtual client. Alternatively, the adjuster may be a participant adjuster that is based on market value in all accounts of the respective participant in the virtual client, wherein the adjuster rate is the same for each account of a participant.

Virtual Client Discount Pricing Method for an Investment Management Provider

The following is an example of the Virtual Client Discount Pricing method for an investment management provider:

1. Each account is assigned to a product category to determine an aggregate utilization rate. In the case of a multiple product assignments, such as an equity account and a fixed income account, the equity portion will be assigned to the equity product category and the fixed income portion will be assigned to the fixed income product category.

2. At the end of a billing cycle, a fee may be determined for each account. The following is a brief description of the Virtual Client Discount Pricing method that calculates the aggregate utilization rate by account:

Product volume—The initial calculation is for separately managed accounts by product category. A fee schedule or discount schedule preferably exists for each product category. The schedule is based upon the aggregated assets of all participants in each product category. The same process is repeated for each product.

Group discount—The next calculation is to determine the group discount. The group discount takes into consideration all assets in all product categories for all participants, and provides an aggregate utilization discount that is available to all participants. This discount is represented as a discount to the fee (total fee or account fee). This process does not exclude there being only one product category.

Adjuster—The final factor in the calculation of the aggregate utilization rates is based on the adjuster. The adjuster is used for recognition of the amount of assets of an individual participant, i.e., to account for the amount of assets of an individual participant. Depending on the amount of assets in the accounts grouped by a participant, a premium or a discount is charged to each account. Participants with greater contributions are recognized with additional discounts. Participants having smaller contributions earn a negative discount.

At the end of this process, a fee (total fee or account fee) is calculated for each account.

The Billing method operates as follows:

1. The fees for the separately managed accounts are derived from the Virtual Client Discount Pricing method. They are then entered into a file on the billing system.

2. The billing system matches the fee with the client profile and generates a bill. This bill is forwarded to the client or any other party authorized to pay the fee, electronically and/or in written form.

3. The Virtual Client Discount Pricing method begins again at the end of the next billing period. The next iteration may include additions and deletions of accounts, as well as changes in market value of existing accounts.

Figure 7:
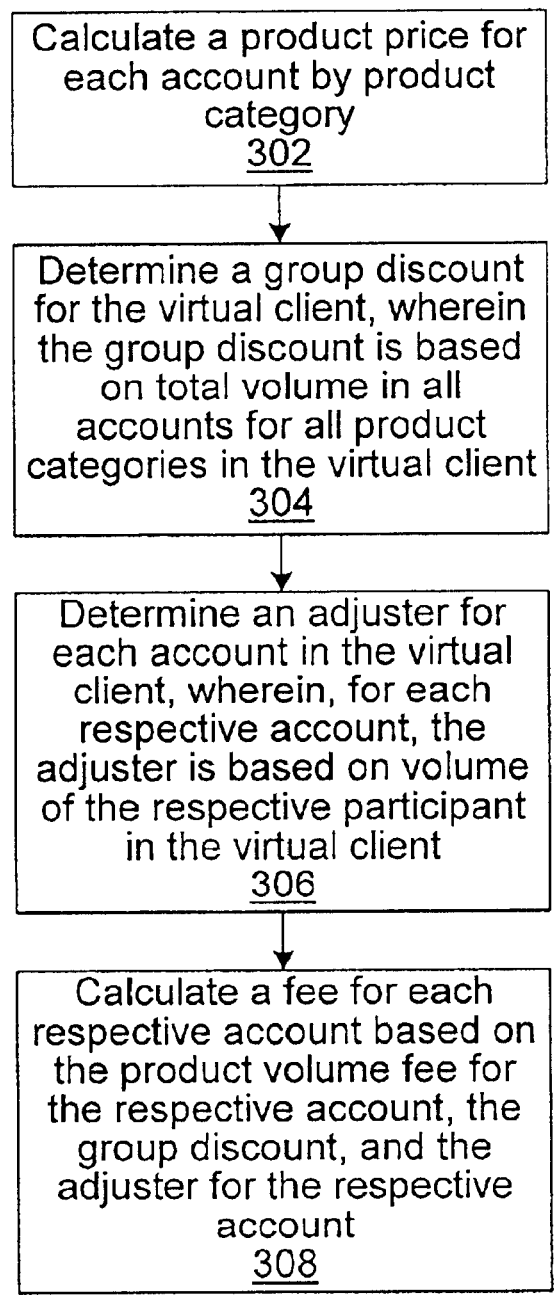
FIG. 7 is a flowchart diagram illustrating operation of the Virtual Client Discount Pricing method with respect to the provider being a general provider of goods or services.

FIG. 7: Virtual Client Discount Pricing Method—General Goods and Services

FIG. 7 is a flowchart diagram illustrating operation of the Virtual Client Discount Pricing method according to the present invention. FIG. 7 illustrates operation of the Virtual Client Discount Pricing method with respect to the provider being a general provider of goods or services.

As shown in the embodiment of FIG. 7, the present invention can be considered a method for determining product pricing for accounts. The accounts are held by a plurality of participants in a virtual client, wherein each of the participants has at least one account. If the provider offers a plurality of products, then typically each account will be assigned to a product category. The method of assessing fees may operate as follows.

In step 302 the method calculates a product pricing for each account, preferably by product category. If the provider 110 offers only one product, or if each of the participant accounts relate to one product, then the method simply calculates a product price for each account, without regard to product category. Step 302 preferably operates in a similar manner to that described in step 202.

In step 304 the method determines a group discount for the virtual client. The group discount may be based on market value in all accounts for all product categories in the virtual client. The method of step 304 preferably uses a discount schedule as described with respect to step 204.

In step 306 the method determines an adjuster for each account in the virtual client. In the preferred methodology, the method of step 306 determines the adjuster in a similar manner to that described with respect to step 206.

In step 308 the method calculates a price or fee for each respective account based on the product pricing for the respective account, the group discount, and the adjuster for the respective account. In the preferred embodiment, for each respective account, the price or fee is calculated as the sum of the product pricing for the respective account, the group discount, and the adjuster for the respective account. The method thus operates to assess prices or fees to each of the accounts for each of the participants. According to the present invention, at least a subset of the participants, generally all of the participants, receive a discounted price or rate from the provider using the virtual client as compared to each of the participants individually accessing goods or services from the provider.

In step 310 the method generates invoices to each of the participants based on the calculated price or fee. The prices or fees for the separately managed accounts are derived from the Virtual Client Discount Pricing method and may then be entered into a file on the billing system. The billing system matches the price or fee with the client profile and generates a bill. This bill is forwarded to the client or any other party authorized to pay the price or fee, electronically and/or in written form.

The method of FIG. 7 is similar to the method of FIG. 3, except a product price is calculated in step 302 of FIG. 7 and used in determining the price or fee to the respective participants, as opposed to the product volume calculated in step 202 of FIG. 3 and used in computing the fee. As noted above, the method of FIG. 7 may be implemented by the provider 110 or the virtual client administrator 120, or a combination thereof.

EXAMPLES

Example 1

Tire purchase by a virtual client. This example demonstrates the formation of a virtual client comprising a group of participants composed of Giant Motor Car Company (GMCC), twenty-five tire distributors and two hundred retail fuel service stations or repair garages.

This group has entered into a Virtual Client Discount Pricing method with the Tire Manufacturing Company of America. Each of the above purchases tires of types A, B and C. GMCC purchases 100 A tires, 100 B tires and 100 C tires per month. The twenty-five distributors purchase 20 A tires, 20 B tires and 20 C tires per month per distributor. In total the distributors buy 500 A tires, 500 B tires and 500 C tires. The two hundred retail fuel service stations purchase 5 A tires, 5 B tires and 5 C tires per month per retail repair garages. In total the two hundred retail fuel service stations buy 1,000 A tires, 1,000 B tires and 1,000 C tires.

The virtual client comprising a group of clients composed of Giant Motor Car Company (GMCC), twenty-five tire distributors and two hundred retail fuel service stations makes an aggregate purchase of 1,600 A tires, 1,600 B tires and 1,600 C tires per month.

As a virtual client, each of the participants will receive a product volume discount by product type for each of the 1,600 tires for each A tires, B tires and C tires. Additionally, each of the participants will receive a group discount on the aggregate 4,800 tires. Participants may also receive a participant adjustment that will increase or decrease their overall discount. This reflects the size of their individual order relative to the group, with larger orders receiving additional discounts and smaller orders paying a premium.

Example 2

Purchase of shares in a mutual fund by a virtual client comprising five institutional investors and two thousand individual investors, using an Internet-based system.

This example demonstrates the formation of a virtual client comprising a group of participants composed of five institutional investors and two thousand individual investors that intend to invest in XYZ Mutual Fund. This virtual client may have been formed as a result of the participants using the Internet to participate in the virtual client. Although this virtual client may have formed utilizing the Internet, the virtual client may have formed by other means. The virtual client may also have formed as a result of the members (participants) of the virtual client being investors in a mutual fund due to their all being clients of the same broker dealer. It is further possible that the broker dealer, although not a member of the group, has facilitated the virtual client formation. In this instance the broker dealer operates as the virtual client administrator.

A virtual client comprising five institutional investors and two thousand individual investors, using an Internet-based system, has come together for the purpose of investing in XYZ Mutual Fund. This group has entered into a Virtual Client Discount Pricing method with the XYZ Mutual Fund. Each of the institutional investors places $5 million in Fund A, $5 million in Fund B and $5 million in Fund C. In total, the institutional investors place $25 million in Fund A, $25 million in Fund B and $25 million in Fund C. The two thousand individual investors each place $20,000 in Fund A, $20,000 in Fund B and $20,000 in Fund C. In total, the two thousand individual investors place $40 million in Fund A, $40 million in Fund B and $40 million in Fund C.

In total, the virtual client comprising five institutional investors and two thousand individual investors, using an Internet-based system, makes an aggregate placement of $65 million in Fund A, $65 million in Fund B and $65 million in Fund C.

As a virtual client, the participants will receive product volume discount by product type for each of Fund A, Fund B and Fund C. Additionally, the participants may receive a group discount on the aggregate $195 million in the XYZ Mutual Fund. Participants may also receive a participant adjustment that will increase or decrease their overall discount. This reflects the size of their individual order relative to the group, with larger orders getting additional discounts and smaller orders paying a premium.

Example 3

Purchase of hardware by a virtual client comprising three stores. Consider a number of individual hardware stores that form a virtual client to purchase material from a supplier.

For example, consider three products: nails, screws, and bolts. Store #1 orders 100 nails, 100 screws and 100 bolts. Store #2 orders 100 nails, 100 screws and 5 bolts. Store #3 orders 1,000 nails, 1,000 screws and 100 bolts. Aggregating by product, the total is 1,200 nails, 1,200 screws and 205 bolts.

Pricing would be done for each individual product on the basis of these total product volumes. A group discount may be applied as a result of the total volume of all products purchased by the virtual client. Finally, an adjuster may be applied to each account. Store #3 may get an additional discount since its volume was high, and similarly, store #1 and store #2 may be charged a premium since their volume is low.

Figure 8A:
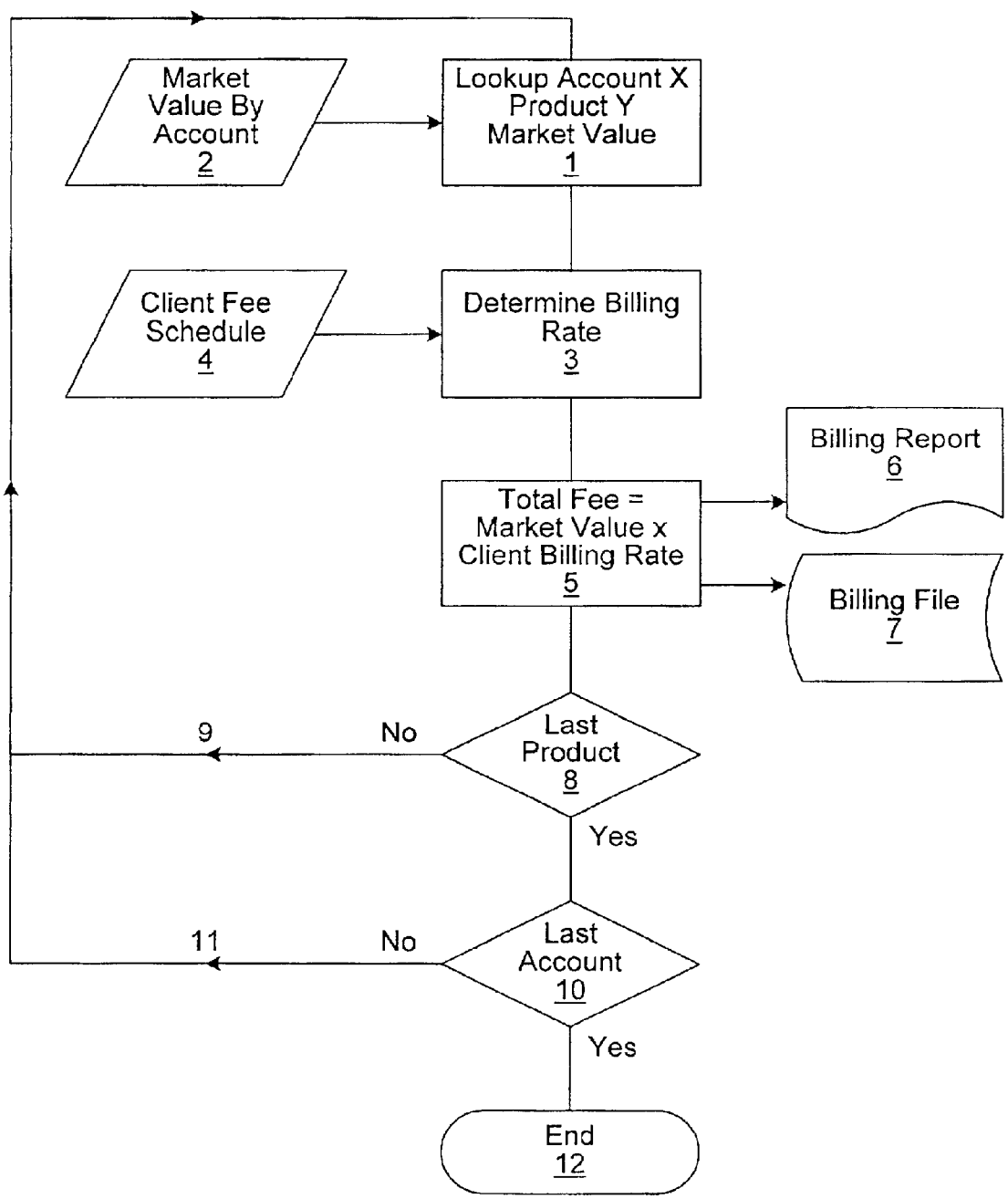
FIG. 8A is a Current Industry Pricing flowchart detailing the flow of information with respect to the pricing methodology for investment management services according to the prior art.

FIG. 8A—Current Industry Pricing Flowchart

FIG. 8A is a Current Industry Pricing Flowchart detailing the flow of information with respect to the pricing methodology for investment management services. This example includes multiple clients, multiple products and a firm wide standardized price schedule. FIG. 8A illustrates the basic volume pricing principle found in competitive markets. The larger volume purchasers achieve substantially lower per-unit prices.

(1) The process begins with the selection of the first account and determining which product is being addressed and (2) looking up the market value for that account. (3) The next step is to determine the rate for this account by (4) looking up this client's fee schedule, which is usually based upon a standard fixed rate fee schedule that is applicable to each product, such as U.S. large cap growth, U.S. small cap value and U.S. fixed income. (5) The total fee is then calculated by multiplying the market value×client billing rate. (6)(7) The information is then sent to a billing file and billing report. (8) It is then determined if this is the last product to be billed for this account. (9) If there are additional products to be billed for this account, go to step 1. (10) If this is the last product for this account, check to see if this is the last account to be billed. (11) If there are any additional accounts to be billed, the process begins again at Step 1. (12) If this is the last account, the process ends.

FIG. 8B—Virtual Client Discount Pricing Method of the Present Invention

FIG. 8B is a flowchart detailing the Virtual Client Discount Pricing method of the present invention with respect to the pricing methodology for investment management services. FIG. 8B includes FIGS. 8B(1) and 8B(2), and these figures are referred to collectively as FIG. 8B. The example shows a virtual client comprising multiple individual participants and the Virtual Client Discount Pricing method with multiple products. FIG. 8B illustrates aggregate utilization pricing methodology.

Aggregate Fee Calculation

Product Volume. (21) The process begins with calculating the product volume rate. This begins with the selection of the first product Y, (22) looking up all of the market values for product Y, and (21) then summarizing the market values for all of product Y. (23) In order to determine the product volume rate, the total market value for the group of clients known as the virtual client, is (24) looked up in the product volume rate schedule. (25) The product volume rate is forwarded to (39) the total fee.

(26) It is determined if it is the last product to be given a product volume rate. (27) If it is not, then the process begins at Step (21). (28) If it is the last product, then move on to the group discount rate.

Group Discount. (29) The group discount lookup summarizes the market values for all the products and creates one total. (30) The total is looked up in the group discount rate schedule. (31) The group discount, which applies to all participants, is forwarded to (39) the total fee.

At this point, the aggregate fee calculation section that includes the product volume rate and the group discount rate has been completed. The method then calculates fees for each individual participant.

Account Fee Calculation

Adjuster Rate. (32) The adjuster rate is determined by looking up the market value comprising all accounts for one individual participant and (33) determining a total market value for that individual participant. (34) The next step is to determine the adjuster rate for each individual participant. (35) A lookup is performed on the adjuster schedule. (36) The result determines whether each individual participant receives a positive or negative adjuster rate that flows to (39) the total fee.

Total Fee. (37) Each account is examined by individual participant (38) to determine its market value. (39) The final step is to calculate the total fee by multiplying the market value x×product volume rate×group discount rate×adjuster rate. (40)(41) The result is posted to the billing report and billing file. (42) A decision is then made if this is the last account for an individual participant. (44) If there are more accounts for this participant, return to step 12. (43) If it is the last account, (45) advance to the next participant. (46) The process continues until all accounts have been billed.

The following terminology refers to the spreadsheets in FIGS. 9,10,11,12 and 13. The reference (A1) will refer to a cell address on the associated spreadsheet. The reference (A1.A11) will refer to a range of cell addresses starting with A1, and then A2, A3, A4, etc. until the last address, in this case being A11. In the spreadsheets that follow, all market values, fees and discounts are arbitrary and have been created for demonstration purposes.

FIG. 9—Spreadsheet of Current Industry Model

FIG. 9 is a spreadsheet illustrating the Current Industry Model (prior art) with respect to investment management services. This spreadsheet is a demonstration of the fixed price methodology that dominates the investment management industry today. FIG. 9 illustrates the basic volume pricing principle found in competitive markets. The larger volume purchasers achieve substantially lower per-unit prices.

(A7)(G7) The process begins with a fee schedule that has level breaks for incremental discount based upon the level of assets invested by an individual client. As the asset value for an individual client increases for an individual product type assignment, the fee decreases. Different products may have different fees and different level breaks. (A3) This methodology, total fee equals market value multiplied by client billing rate, is calculated separately (A15.A34) for each individual account. The formula for computing (G13.G34) the total fee is (C13.C34) the market value multiplied by (E13.E34) the client billing rate.

FIG. 10—Spreadsheet of Virtual Client Discount Pricing Method

FIG. 10 is a spreadsheet illustrating the operation of the Virtual Client Discount Pricing method in conjunction with a preferred embodiment with respect to investment management services. This example shows a virtual client comprising multiple individual participants with a Virtual Client Discount Pricing method for a single product and multiple products. The spreadsheet of FIG. 10 includes FIGS. 10A–10M, and these figures are referred to collectively as FIG. 10.

FIG. 10 illustrates a virtual client comprising individual participants with different volume levels, including very substantial volume levels. In this case, the Virtual Client Discount Pricing method is determined by the aggregate utilization, which consists of the product volume, group volume and individual participant volume. This example shows a virtual client comprised of multiple individual participants with a Virtual Client Discount Pricing method for a single product and multiple products.

Multi-Product Summary (A76) FIG. 10, section 1 will be explained at (A388) of FIG. 10, section 3, Multi-Product Example.

Single Product Example

In FIG. 10, section 2, (A239) the Single Product Example process begins with (A123 aggregate fee calculation comprised of (A126) product volume fee and (A154) group discount. It is followed by the account fee calculation comprised of (A187) adjuster and (A219) the total fee.

Aggregate Fee Calculation

The aggregate fee calculation comprises the (A126) product volume and (A154) the group discount. These fees are based upon the total assets invested in each product and in all products by the virtual client, respectively.

The (A126) product volume is calculated by aggregating (A140.A149) the market value for product 1 and looking up the product volume rate for (A150) the total market value in (A130) the product 1 fee schedule. This process is repeated for each product although in this example there is only one product. Once the product volume rate has been determined from the (A130) the product fee schedule, it is inputted in to (E140.E150) the product volume rate column.

Then for each account, (A140.A149) the market value is multiplied by the (E140.E150) product volume rate and the result is a (G140.G149) the product volume fee for each account. This information is then passed along to the (A216) total fee section.

The next calculation is (A154) the group discount. Again, (C173.C182) the market values are aggregated for all products into a total market value. In the case of multiple products, the total market value is aggregated across all product lines. (C183) The total market value, which represents the total assets of the virtual client, is looked up in the (E158) market value schedule at which time a (G160) group discount rate is determined.

Then for each account, (C173.C182) the market value is multiplied by the (G160) group discount rate and the result is a (G173.G182) the group discount amount for each account. This information is then passed along to the (A216) total fee section.

Account Fee Calculation

The next step in the process is the individual account fee calculation, which comprises the (A187) adjuster and (A216) total fee. This section pertains to individual participant accounts within the virtual client.

The (A187) adjuster is calculated by selecting (C202) the market value for the first account and looking up (B191) the adjuster rate for each individual account thereafter. This process is repeated for each account until all the lookups have been performed. Once the adjuster rate has been determined from the (B191) the adjuster rate schedule, it is inputted to positions E202.E211. In the VCDP method, the adjuster rate applies to all accounts.

Then for each account, (C202.C211) the market value is multiplied by (E202.E211) the adjuster rate and the result is a (G202.G211) the adjuster amount. This information for each account is then passed along to the (A216) total fee section.

The final step in the process is to calculate (A216) the total fee for each individual account. (A226.A235) For each account, (C226.C235) the market value is multiplied by each of the following; (F226.F235) the product volume rate, (H226.H235) the group discount rate and (J226.J235) the adjuster rate. The result is (K226.K235) the total fee dollars. (L226.L235) total basis points is determined by dividing (K226.K235) the total fee dollars by (C226.C235) the market value.

Multi-Product Example

In FIG. 10, section 3, (A239) the Multi-Product Example process begins with aggregate fee calculation comprised of (A242) product volume and (A304) group discount. It is followed by the account fee calculation comprised of (A351) adjuster and (A389) the total fee.

Aggregate Fee Calculation

The aggregate fee calculation comprises the (A242) product volume and (A304) group discount. These fees are based upon the total assets invested in each product and in all products by the virtual client, respectively.

The (A242) product volume for product 1 is calculated by aggregating (A256.A265) the market value for product 1 and looking up the product volume rate for (A266) the total market value in (A246) the product 1 fee schedule. Once the product volume rate has been determined from the (A246) the product 1 fee schedule, it is inputted in to (E256.E265) the product volume rate column. This process is repeated for each product.

Then for each account, (A256.A265) the market value is multiplied by the (E256.E265) product volume rate and the result is a (G256.G265) the product volume fee for each account. This information for each account is then passed along to the (A389) total fee section.

The (A270) product volume fee for product 2 is calculated by aggregating (A284.A293) the market value for product 2 and looking up the product volume rate for (A294) the total market value in (A274) the product 2 fee schedule. Once the product volume rate has been determined from the (A274) the product 2 fee schedule, it is inputted in to (E284.E293) the product volume rate column.

Then for each account, (A284.A293) the market value is multiplied by the (AE84.E293) product volume rate and the result is a (G284.G293) the product volume fee for each account. This information for each account is then passed along to the (A389) total fee section.

The next calculation is (A304) the group discount. Again, (C328.C347) the market values are aggregated for all products into a total market value. In this case of multiple products, the total market value is aggregated across both product lines. (C348) The total market value, which represents the total assets of the virtual client, is looked up in the (E308) market value schedule at which time a (G311) group discount rate is determined.

Then for each account, (C173.C182) the market value is multiplied by the (G160) group discount rate and the result is a (G173.G182) the group discount amount for each account. This information is then passed along to the (A389) total fee.

Account Fee Calculation

The next step in the process is the individual account fee calculation that consists of the (A351) adjuster and (A389) total fee. This section's calculations pertain to individual participant accounts within the virtual client.

The (A351) adjuster is calculated by selecting (C366) the market value for the first account and looking up (B355) the adjuster rate for each individual account thereafter. This process is repeated (A366.A385) for each account until all the lookups have been performed. Once the adjuster rate has been determined from the (B355) the adjuster rate schedule, it is inputted to positions (E366.E385). In the case of participant 1, accounts 1 & 11 are combined (K368) to determine (B359) the adjuster. The adjuster rate applies to all accounts.

Then for each account, (C366.C385) the market value is multiplied by (E366.E385) the adjuster rate and the result is a (G366.G385) the adjuster amount for each account is then passed along to the (A389) total fee.

The final step in the process is to calculate (A389) the total fee for each individual account. (A399.A418) For each account, (C399.C418) the market value is multiplied by each of the following; (F399.F418) the product volume rate, (H399.H418) the group discount rate and (J399.J418) the adjuster rate. The result is (K399.K418) the total fee dollars. (L399.L418) Total basis points is determined by dividing (K399.K418) the total fee dollars by (C399.C418) the market value.

Comparison of Fee Structures (A425) This final section is a comparison between the (A429) Current Industry Pricing Model and (A430) the Virtual Client Discount Pricing method.

(G429) The total fee dollars for the Current Industry Pricing Model is calculated in (G35) FIG. 9, Current Industry Pricing Model—Summary. (I429) The total fee basis points for the Current Industry Pricing Model is calculated in (E35) FIG. 9, Current Industry Pricing Model—Summary.

(G430) The total fee dollars for the Virtual Client Discount Pricing method is calculated in (K419) Virtual Client Discount Pricing method—total fee. (I430) The total fee basis points for the Virtual Client Discount Pricing method is calculated in (L419) FIG. 10, Virtual Client Discount Pricing method—total fee.

FIG. 11—Formation of a Virtual Client

FIG. 11 illustrates the formation of a virtual client from a group of individual participants. This example consists of (A4.A11) eight individuals, (A12.A26) fifteen independent retail stores, (A27.A34) eight mail order distributors and (A35.A39) five warehouse stores. These thirty-nine individual participants have come together for the purpose of forming a virtual client.

FIG. 12—Spreadsheet for Example of Prior Art—Orders for Products 1&2

FIG. 12 is a spreadsheet illustrating the prior art with respect to purchasing multiple products. This spreadsheet is a demonstration of the fixed price methodology that dominates the manufacturing and distribution industries today. FIG. 12 illustrates the basic volume pricing principle found in competitive markets. The larger volume purchasers achieve substantially lower per-unit prices.

The process begins with (A6) a price schedule that has level breaks for incremental discount based upon the level of units purchased by an individual client. As the units for an individual client increases for an individual product type, the per unit price decreases. Different products may have different prices and different level breaks. (E7) This methodology is product volume (amount) equals units multiplied by price for each individual account. The formula for computing (E14.E26) the total amount for product 1 is (C14.C26) the unit is multiplied by (D14.D26) the price.

The formula for computing (H14.H26) the product volume (amount) for product 2 is (F14.F26) the units multiplied by price (G14.G26) for each individual account. (I14.I260) The total amount for products 1&2 is (E14.E26) product 1 amount added to (H14.H26) product 2 amount.

FIG. 13—Spreadsheet of Virtual Client Discount Pricing Method

FIG. 13 is a spreadsheet illustrating the operation of the Virtual Client Discount Pricing method in conjunction with a preferred embodiment with respect to purchasing multiple goods. This example shows a virtual client comprising multiple individual participants with a Virtual Client Discount Pricing method for multiple products. The spreadsheet of FIG. 13 includes FIGS. 13A–13E, and these figures are referred to collectively as FIG. 13.

FIG. 13 illustrates a virtual client comprising individual participants with different volume levels, including very substantial volume levels. In this case, the Virtual Client Discount Pricing method is determined by the aggregate utilization, which consists of the product volume, group volume and individual participant volume. This example shows a virtual client comprised of multiple individual participants with a Virtual Client Discount Pricing method for multiple products.

Multi-Product Example

In FIG. 13, section 3, (A30) the Example of Virtual Client Discount Pricing Method begins with aggregate fee calculation comprised of (A34) product volume and (A63) group discount. It is followed by the account fee calculation comprised of (A94) adjuster and (A128) the total fee.

Aggregate Fee Calculation

The aggregate fee calculation is comprised of the (A34) product volume and (A63) group discount. These fees are based upon the total assets invested in each product and in all products by the virtual client, respectively.

The (A34) product volume (amount) for product 1 is calculated by aggregating (B46.B58) the units for product 1 and looking up the product volume price for (B59) the total units in (B39) the product 1 price schedule. Once the product volume price has been determined from the (A38) the product 1 price schedule, it is inputted in to (C46.C58) the product 1 price column. This process is repeated for each product.

Then for each participant, (B46.B58) the units is multiplied by the (C46.C58) product price and the result is a (D46.D58) the product volume (amount) for each account. This information for each participant is then passed along to the (A128) total fee section.

The (A34) product volume (amount) for product 2 is calculated by aggregating (E46.E58) the units for product 2 and looking up the product price for (E59) the total units in (C39) the product 2 price schedule. Once the product volume price has been determined from the (C39) the product 2 fee schedule, it is inputted in to (F46.F58) the product 2 price column.

Then for each participant, (E46.E58) the units is multiplied by the (F46.F58) product volume price and the result is a (G46.G58) the product amount for each account. This information for each participant is then passed along to the (A128) total fee section.

The next calculation is (A63) the group discount. (D46.D58) The total amounts are aggregated for all products. In this case of multiple products, the total amount is aggregated across both product lines. (D89) The total amount, which represents the total amount of the virtual client, is looked up in the (A67) group discount schedule at which time a (E76.E88) group discount rate is determined.

Then for each participant, (D76.D88) the total amounts are multiplied by the (E76.E88) group discount rate and the result is a (F76.F88) the group discount for each participant. This information is then passed along to the (A128) total fee section.

Account Fee Calculation

The next step in the process is the individual account fee calculation that consists of the (A94) adjuster and (A128) total fee. This section pertains to individual participant accounts within the virtual client.

The (A94) adjuster is calculated by selecting (E111) the total amount for the first account and looking up (B98) the adjuster rate. This process is repeated (E111.E123) for each participant until all the lookups have been performed. Once the adjuster rate has been determined from the (B355) the adjuster rate schedule, it is inputted to positions (F111.F123).

Additionally, (C111.C123) and (D111.D123) each account (product amount) is checked to see if a minimum was (D99) was met. If not, then (G111.G123)) the account adjuster replaces the (E111.E123) participant adjuster. The adjuster rate applies to all accounts.

Then for each participant, (E111.E123)) the total amount is multiplied by (F111.F123) and (G111.G123) the adjuster rate and the result is a (H111.H123) the adjuster for each participant. This information is then passed along to the (A128) total fee.

The final step in the process is to calculate (A128) the total fee for each individual participant. (A135.A147) For each participant, (B135.B147) the product volume is added to (C135.C147) the group discount and (D135.D147) the adjuster. The result is (E135.E147) the total amount.

SUMMARY (A151) This final section is a comparison between the (A152) Example of Prior Art and (A153) the Virtual Client Discount Pricing Method resulting in (A155) the differential.

The above description is merely illustrative of the system and method of this invention. Other methods and systems can be used by those skilled in the art without departing from the spirit and scope of the present invention.

What is claimed is:

1. A method for assessing investment management fees to accounts, wherein the accounts are maintained in an investment management system, wherein the accounts are held by a plurality of participants in a virtual client, wherein each of the participants has at least one account, wherein each account is assigned to a respective one of a plurality of product categories, wherein said assessing fees comprises:

for each of the plurality of product categories, calculating a product volume fee for each account using a computer system;

determining a group discount for the virtual client, wherein the group discount is based on market value in all accounts for the plurality of product categories in the virtual client, wherein the group discount is based on a single group discount rate, and wherein the group discount rate is applied to each of the respective accounts in the virtual client;

determining an adjuster for each account in the virtual client, wherein, for each respective account, the adjuster is based on market value of the respective account in the virtual client, wherein each of the adjusters is based on a respective adjuster discount rate, and wherein the adjuster discount rates vary with the market value of the respective accounts in the virtual client;

calculating a fee for each respective account based on the product volume fee for the respective account, the group discount, and the adjuster for the respective account; and billing the participants for the calculated fees on a periodic basis using the computer system.

2. The method of claim 1, wherein, for each respective product category, said calculating a product volume fee comprises:

aggregating market value of all accounts for the respective product category to produce a total product market value;

calculating a product volume rate based on the total product market value and a discount schedule; and calculating a product volume fee for each account for the respective product category based on the product volume rate and the market value of each account.

3. The method of claim 2, wherein the product volume fee for each account for the respective product category is calculated as the product volume rate multiplied by the market value of each account.

4. The method of claim 1, wherein said determining the group discount comprises:
aggregating market value of all accounts for all product categories to produce a total market value;
calculating the group discount rate based on the total market value and a discount schedule; and
calculating the group discount for each account, wherein, for each respective account, the group discount is calculated based on the group discount rate and the market value for the respective account.

5. The method of claim 4, wherein the group discount for each account is calculated as the group discount rate multiplied by the market value for the respective account.

6. The method of claim 1, wherein the adjuster is based on market value of the respective account in the virtual client and a discount schedule.

7. The method of claim 6, wherein the discount schedule is applied on a per account basis.

8. The method of claim 6, wherein the discount schedule is applied on a per participant basis.

9. The method of claim 6, wherein, for a respective participant, said determining the adjuster comprises:
aggregating market value of all accounts for a respective participant to produce a participant market value;
apply the participant market value to the discount schedule to produce an adjuster rate; and
calculating the adjuster for each respective account of the respective participant based on the adjuster rate and the market value of the respective account.

10. The method of claim 1, wherein the adjuster is an account adjuster calculated independently for each account basis based on market value in an account of the respective participant in the virtual client.

11. The method of claim 1, wherein the adjuster is an adjuster that is based on market value in all accounts of the respective participant in the virtual client.

12. The method of claim 1, wherein the adjuster is calculated on a per-account basis based on market value in an account of the respective participant in the virtual client.

13. The method of claim 1, wherein, for a respective account, the fee is calculated as the sum of the product volume fee for the respective account, the group discount, and the adjuster for the respective account.

14. The method of claim 1, wherein at least a subset of the participants receives a discounted rate from the provider using the virtual client as compared to each of the participants individually accessing goods or services from the provider.

15. The method of claim 1, wherein all of the participants receive a discounted rate from the provider using the virtual client as compared to each of the participants individually accessing goods or services from the provider.

16. The method of claim 1, wherein the method operates to assess investment management fees to each of the participants.

17. The method of claim 1, wherein the method operates to assess investment management fees to each of the accounts.

18. The method of claim 1, further comprising:
generating invoices to each of the participants based on the calculated fee.

19. The method of claim 1, wherein calculating the fee for each respective account further comprises calculating the fee to ensure a minimum profit level per participant.

20. The method of claim 1, wherein calculating the fee for each respective account further comprises calculating the fee to ensure a minimum profit level per product category.

21. The method of claim 1, wherein calculating the fee for each respective account further comprises calculating the fee to ensure a minimum profit level per virtual client.

22. The method of claim 1, wherein the product volume fee for at least one account includes no discount.

23. The method of claim 1, wherein the group discount is zero.

24. A computer-implemented method for assessing investment management fees to accounts, wherein the accounts are maintained in an investment management system, wherein the accounts are held by a plurality of participants in a virtual client, wherein the virtual client persists beyond a purchase at a single point in time, wherein each of the participants has at least one account, wherein said assessing fees comprises:
calculating a product volume fee for each account using a computer system;
determining a group discount for the virtual client, wherein the group discount is based on market value in all accounts in the virtual client, wherein the group discount is based on a single group discount rate, and wherein the group discount rate is applied to each of the respective accounts in the virtual client;
determining an adjuster for each account in the virtual client, wherein, for each respective account, the adjuster is based on market value of the respective account in the virtual client, wherein each of the adjusters is based on a respective adjuster discount rate, and wherein the adjuster discount rates vary with the market value of the respective accounts in the virtual client;
programmatically calculating a fee for each respective account based on the product volume fee for the respective account, the group discount, and the adjuster for the respective account; and
storing the calculated fees in a memory of the computer system.

25. The method of claim 24, wherein said determining the group discount comprises:
aggregating market value of all accounts to produce a total market value;
calculating the group discount rate based on the total market value and a discount schedule; and
calculating the group discount for each account, wherein, for each respective account, the group discount is calculated based on the group discount rate and the market value for the respective account.

26. A method for assessing investment management fees to participants, comprising:
determining fees for each account in a virtual client, wherein the virtual client comprises a plurality of participants, wherein each of the participants has at least one account, wherein each account is assigned to a respective one of a plurality of product categories; wherein said determining fees comprises:
for each of the plurality of product categories, calculating a product volume fee for each account using a computer system;

determining a group discount for the virtual client, wherein the group discount is based on assets in all accounts for the plurality of product categories in the virtual client, wherein the group discount is based on a single group discount rate, and wherein the group discount rate is applied to each of the respective accounts in the virtual client;

determining an adjuster for each account in the virtual client, wherein, for each respective account, the adjuster is based on assets of the respective account in the virtual client, wherein each of the adjusters is based on a respective adjuster discount rate, and wherein the adjuster discount rates vary with the market value of the respective accounts in the virtual client; and calculating a fee for each respective account based on the product volume fee for the respective account, the group discount, and the adjuster for the respective account; and billing each of the participants in the virtual client for the respective determined fees on a periodic basis using the computer system.

27. A method for managing investment accounts, comprising:

providing investment management services to a virtual client, wherein the virtual client comprises a plurality of participants, wherein each of the participants has at least one account, wherein each account is assigned to a respective one of a plurality of product categories; and determining fees for each of the accounts in the virtual client, comprising:

for each of the plurality of product categories, calculating a product volume fee for each account using a computer system;

determining a group discount for the virtual client, wherein the group discount is based on assets in all accounts for the plurality of product categories in the virtual client, wherein the group discount is based on a single group discount rate, and wherein the group discount rate is applied to each of the respective accounts in the virtual client;

determining an adjuster for each account in the virtual client, wherein, for each respective account, the adjuster is based on assets of the respective account in the virtual client, wherein each of the adjusters is based on a respective adjuster discount rate, and wherein the adjuster discount rates vary with the market value of the respective accounts in the virtual client; and calculating a fee for each respective account based on the product volume fee for the respective account, the group discount, and the adjuster for the respective account; and billing each of the participants in the virtual client for the respective determined fees on a periodic basis using the computer system.

28. A computer-implemented method for determining product pricing for accounts in a virtual client, wherein the virtual client comprises a plurality of participants, wherein each of the participants has at least one account, wherein each account is assigned to at least one product category of a plurality of product categories, wherein said determining product pricing comprises:

programmatically calculating a product price for each account; using a computer system programmatically determining a group discount for the virtual client, wherein the group discount is based on total volume in all accounts for the plurality of product categories in the virtual client, wherein the group discount is based on a single group discount rate, and wherein the group discount rate is applied to each of the respective accounts in the virtual client;

programmatically determining an adjuster for each account in the virtual client, wherein, for each respective account, the adjuster is based on volume of the respective account in the virtual client, wherein each of the adjusters is based on a respective adjuster discount rate, and wherein the adjuster discount rates vary with the market value of the respective accounts in the virtual client; and programmatically calculating a fee for each respective account based on the product volume fee for the respective account, the group discount, and the adjuster for the respective account; and storing the calculated fees in a memory of the computer system.

29. The method of claim 28, wherein, for each respective product category, said calculating a product price comprises:

aggregating volume of all accounts for the respective product category to produce a total product volume;

calculating a product volume rate based on the total product volume and a discount schedule; and calculating a product volume fee for each account for the respective product category based on the product volume rate and the market value of each account.

30. The method of claim 29, wherein the product volume fee for each account for the respective product category is calculated as the product volume rate multiplied by the volume of each account.

31. The method of claim 28, wherein said determining the group discount comprises:

aggregating volume of all accounts for all product categories to produce a total volume;

calculating the group discount rate based on the total volume and a discount schedule; and calculating the group discount for each account, wherein, for each respective account, the group discount is calculated based on the group discount rate and the volume for the respective account.

32. The method of claim 31, wherein the group discount for each account is calculated as the group discount rate multiplied by the volume for the respective account.

33. The method of claim 28, wherein the adjuster is based on volume of the respective account in the virtual client and a discount schedule.

34. The method of claim 33, wherein the discount schedule is applied on a per account basis.

35. The method of claim 33, wherein the discount schedule is applied on a per participant basis.

36. The method of claim 33, wherein, for a respective participant, said determining the adjuster comprises:

aggregating volume of all accounts for a respective participant to produce a participant volume;

apply the participant volume to the discount schedule to produce a participant discount rate; and calculating the adjuster for each respective account of the respective participant based on the participant discount rate and the volume of the respective account.

37. The method of claim 28, wherein the adjuster is an account adjuster calculated independently for each account basis based on volume in an account of the respective participant in the virtual client.

38. The method of claim 28, wherein the adjuster is a participant adjuster that is based on volume in all accounts of the respective participant in the virtual client.

39. The method of claim 28, wherein the adjuster is calculated on a per-account basis based on volume in an account of the respective participant in the virtual client.

40. The method of claim 28, wherein, for a respective account the fee is calculated as the sum of the product volume fee for the respective account, the group discount, and the adjuster for the respective account.

41. The method of claim 28, wherein at least a subset of the participants receives a discounted rate from the provider using the virtual client as compared to each of the participants individually accessing goods or services from the provider.

42. The method of claim 28, wherein all of the participants receive a discounted rate from the provider using the virtual client as compared to each of the participants individually accessing goods or services from the provider.

43. The method of claim 28, wherein method operates to assess investment management fees to each of the participants.

44. The method of claim 28, wherein the volume comprises units.

45. The method of claim 28, wherein the volume comprises market value.

46. The method of claim 28, wherein the volume comprises revenue.

47. The method of claim 28, further comprising:
generating invoices to each of the participants based on the calculated fee.

48. The method of claim 28, wherein calculating the fee for each respective account further comprises calculating the fee to ensure a minimum profit level per participant.

49. The method of claim 28, wherein calculating the fee for each respective account further comprises calculating the fee to ensure a minimum profit level per product category.

50. The method of claim 28, wherein calculating the fee for each respective account further comprises calculating the fee to ensure a minimum profit level per virtual client.

51. The method of claim 28, wherein the product volume fee for at least one account includes no discount.

52. The method of claim 28, wherein the group discount is zero.

53. A memory medium comprising program instructions for assessing investment management fees to accounts, wherein the accounts are maintained in an investment management system, wherein the accounts are held by a plurality of participants in a virtual client, wherein each of the participants has at least one account, wherein each account is assigned to a respective one of a plurality of product categories; wherein the program instructions are executable by a computer to implement:

for each of the plurality of product categories, calculating a product volume fee for each account using a computer;

determining a group discount for the virtual client, wherein the group discount is based on market value in all accounts for the plurality of product categories in the virtual client, wherein the group discount is based on a single group discount rate, and wherein the group discount rate is applied to each of the respective accounts in the virtual client;

determining an adjuster for each account in the virtual client, wherein, for each respective account, the adjuster is based on market value of the respective account in the virtual client, wherein each of the adjusters is based on a respective adjuster discount rate, and wherein the adjuster discount rates vary with the market value of the respective accounts in the virtual client;

calculating a fee for each respective account based on the product volume fee for the respective account, the group discount, and the adjuster for the respective account; and storing the fee for each respective account in a memory.

54. A method for assessing discounted investment management fees to a plurality of accounts, wherein the accounts are held by a plurality of participants in a virtual client, wherein each of the participants has at least one account, and wherein the method for assessing discounted investment management fees comprises:

determining a first discount for each account, using a computer wherein each account is assigned to a respective product category of a plurality of product categories, wherein the first discount increases with an increasing market value of all accounts assigned to the respective product category in the virtual client;

determining a second discount for each account, wherein the second discount increases with an increasing market value of all accounts for the plurality of product categories in the virtual client;

determining a third discount for each account, wherein the third discount increases with an increasing market value of the respective account in the virtual client;

determining a total discount for each respective account, wherein the total discount comprises the first discount, the second discount, and the third discount for the respective account;

determining an investment management fee for each respective account by subtracting the total discount for the respective account from a total market value of one or more products purchased in the respective account; and collecting the investment management fees from the plurality of participants on a periodic basis using the computer system.

* * * * *

UNITED STATES PATENT AND TRADEMARK OFFICE
CERTIFICATE OF CORRECTION

PATENT NO. : 6,928,416 B1
DATED : August 9, 2005
INVENTOR(S) : Michael L. Bertash It is certified that error appears in the above-identified patent and that said Letters Patent is hereby corrected as shown below:

Column 26,
Line 30, please delete "computer wherein" and substitute -- computer system wherein --.

Signed and Sealed this

Twenty-second Day of November, 2005

JON W. DUDAS
*Director of the United States Patent and Trademark Office*